United States Patent
Motomura et al.

(10) Patent No.: US 7,486,837 B2
(45) Date of Patent: Feb. 3, 2009

(54) METHOD, DEVICE, AND PROGRAM FOR IMAGE CONVERSION, METHOD, DEVICE AND PROGRAM FOR TEXTURE MAPPING, AND SERVER-CLIENT SYSTEM

(75) Inventors: Hideto Motomura, Nara (JP); Katsuhiro Kanamori, Nara (JP); Kenji Kondo, Kyoto (JP); Satoshi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 264 days.

(21) Appl. No.: 11/369,975

(22) Filed: Mar. 7, 2006

(65) Prior Publication Data
US 2006/0176520 A1 Aug. 10, 2006

Related U.S. Application Data

(63) Continuation of application No. PCT/JP2005/021687, filed on Nov. 25, 2005.

(30) Foreign Application Priority Data
Dec. 7, 2004 (JP) .............................. 2004-354274

(51) Int. Cl.
- G06T 3/40 (2006.01)
- G06T 17/00 (2006.01)
- G06K 9/40 (2006.01)
- H04N 5/57 (2006.01)
- G06K 9/36 (2006.01)

(52) U.S. Cl. .................. 382/274; 382/300; 382/276; 382/285; 382/286; 382/299; 348/687; 345/426; 345/581; 345/582; 345/589; 358/3.27; 358/521; 358/525; 358/448

(58) Field of Classification Search ................. 382/169, 382/167, 176, 309, 285, 190, 274, 298, 300; 358/1.1, 1.2, 1.9, 2.1, 520–523, 463; 345/590, 345/591, 596, 601, 602, 617, 589, 606; 348/607, 348/241, 217.1, 207.99, 207.1, 207.11, 211.3; 709/203
See application file for complete search history.

(56) References Cited

U.S. PATENT DOCUMENTS 5,704,024 A * 12/1997 Voorhies et al. ............. 345/426

(Continued)

FOREIGN PATENT DOCUMENTS

EP 1008957 A1 6/2000

(Continued)

OTHER PUBLICATIONS

H. Greenspan et al., "Image enhancement by non-linear extrapolation in frequent space", SPIE vol. 2182, Image and Video Processing II, pp. 2-11, 1994 (in English).

(Continued)

Primary Examiner—Twyler L Haskins
Assistant Examiner—Chad Dickerson
(74) Attorney, Agent, or Firm—Harness, Dickey & Pierce, P.L.C.

(57) ABSTRACT

A plurality of parameters included in a predetermined illumination equation which defines a brightness are acquired for each pixel of an image. For each of the parameters, a homogeneous region including pixels which are similar in value of the parameter is specified. In each of the specified homogeneous region, each of the parameters is converted according to details of the predetermined image conversion. The brightness of each pixel of a second image is determined using the values of the parameters obtained after the conversion.

16 Claims, 18 Drawing Sheets

U.S. PATENT DOCUMENTS

| | | | |
|---|---|---|---|
| 5,848,181 A * | 12/1998 | Ogata | 382/169 |
| 5,872,864 A * | 2/1999 | Imade et al. | 382/176 |
| 6,556,195 B1 | 4/2003 | Totsuka et al. | |
| 6,728,406 B1 * | 4/2004 | Murao | 382/191 |
| 6,753,875 B2 * | 6/2004 | Ritter | 345/582 |
| 7,176,965 B1 * | 2/2007 | Noguchi | 348/222.1 |
| 7,379,618 B2 * | 5/2008 | Motomura et al. | 382/274 |
| 2002/0169805 A1 * | 11/2002 | Edge | 707/528 |
| 2003/0053689 A1 * | 3/2003 | Watanabe et al. | 382/167 |
| 2003/0107568 A1 * | 6/2003 | Urisaka et al. | 345/419 |
| 2003/0174886 A1 * | 9/2003 | Iguchi et al. | 382/167 |

FOREIGN PATENT DOCUMENTS

| | | |
|---|---|---|
| JP | 03-026181 A | 2/1991 |
| JP | 07-037105 A | 2/1995 |
| JP | 09-44654 A | 2/1997 |
| JP | 2000-057378 A | 2/2000 |
| JP | 2000-137833 A | 5/2000 |
| JP | 2003-216973 A | 7/2003 |
| JP | 2005-149390 A | 6/2005 |
| WO | WO-99-63488 A1 | 12/1999 |

OTHER PUBLICATIONS

R. J. Woodham, "Photometric method for determining surface orientation from multiple images", Optical Engineering vol. 19, No. 1, pp. 139-144, 1980 (in English).

S. Tominaga et al., "Estimating reflection parameters from a single color image", IEEE Computer Graphics and Applications, vol. 20, Issue 5, pp. 58-66, 2000 (in English).

Shinji Araya, "Clear commentary on 3D computer graphics", Kyoritsu Shuppan Co., Ltd., pp. 144-145, Sep. 25, 2003 (w/ partial English translation).

Makoto Nakashizu, et al., "Image Resolution Enhancement on Multiscale Gradient Planes", The IEICE transactions (Japanese Edition), D-II, vol. J81-D-II, No. 10, pp. 2249-2258, Oct. 1998 (w/ partial English translation).

"Broadband + Mobile Standard MPEG Textbook: Point-by Point Illustration", edited by Multimedia Communications Study Group, ASCII Corporation, pp. 25-29, Feb. 11, 2003 (w/ partial English translation).

"Image Processing Handbook", edited by Image Processing Handbook Editorial Committee, Shokodo Co., Ltd., p. 393, Jun. 8, 1987 (w/ partial English translation).

Shinji Umeyama, "Separation of diffuse and specular components of surface reflection—using multiple observations through a polarizer and probabilistic independence property" Symposium on image recognition and understanding 2002, pp. I-469-I-476, 2002 (w/ partial English translation).

* cited by examiner

FIG. 10
(a) Before conversion
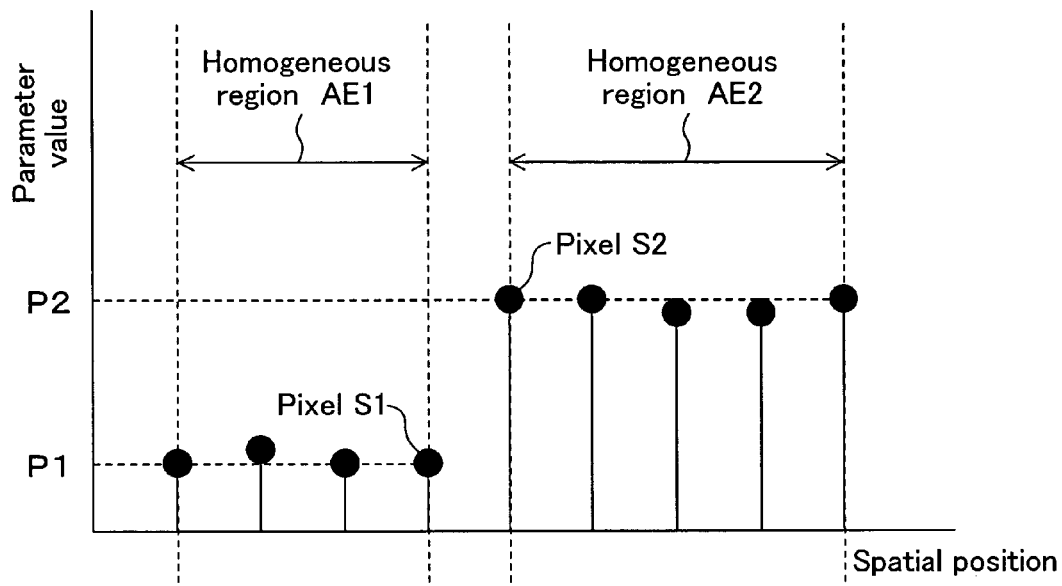
(b) After conversion
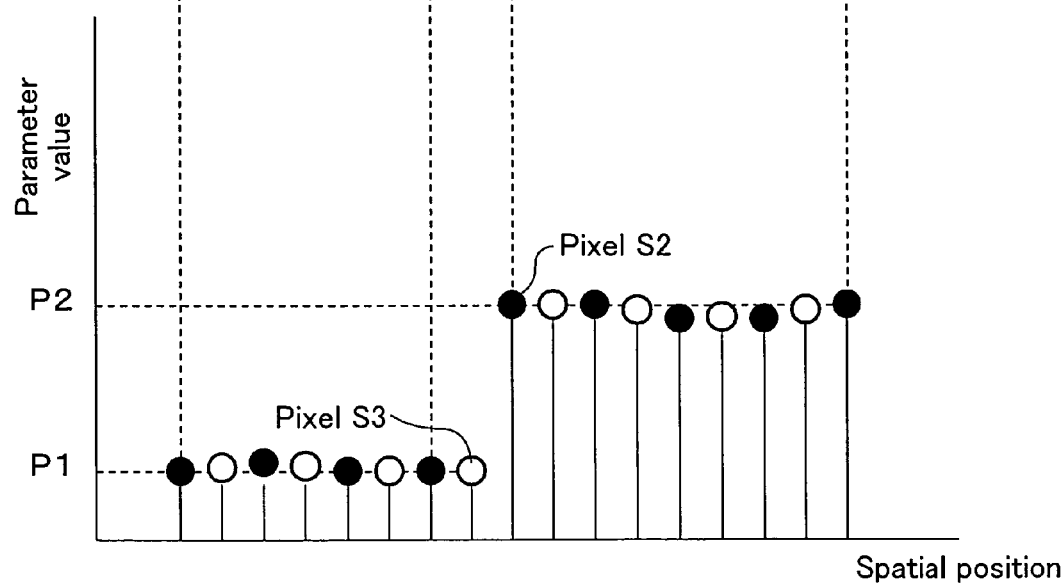

FIG. 11
(a) Before conversion
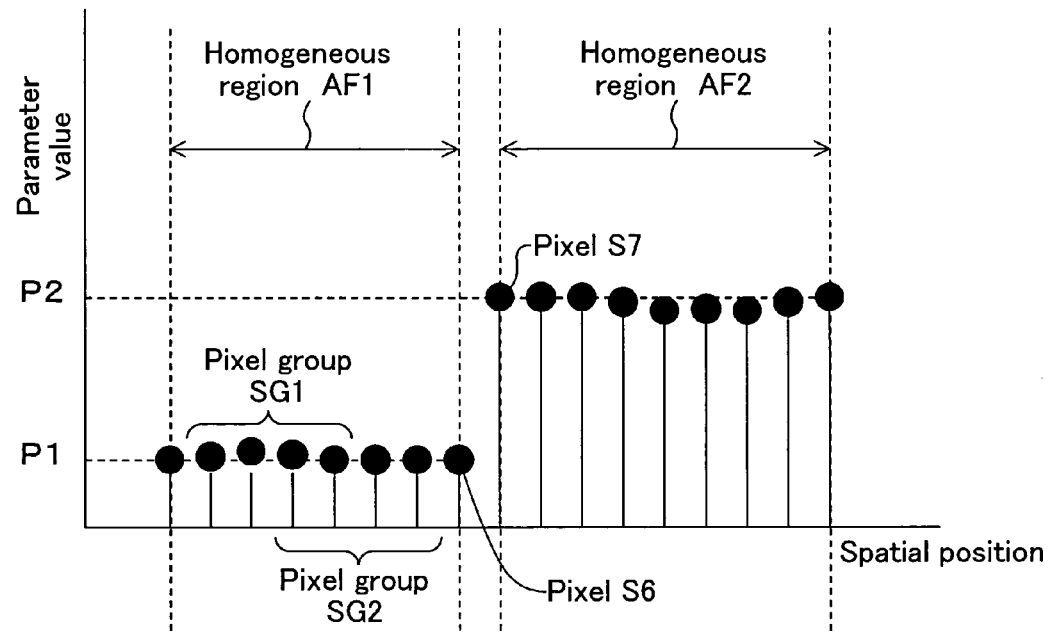
(b) After conversion
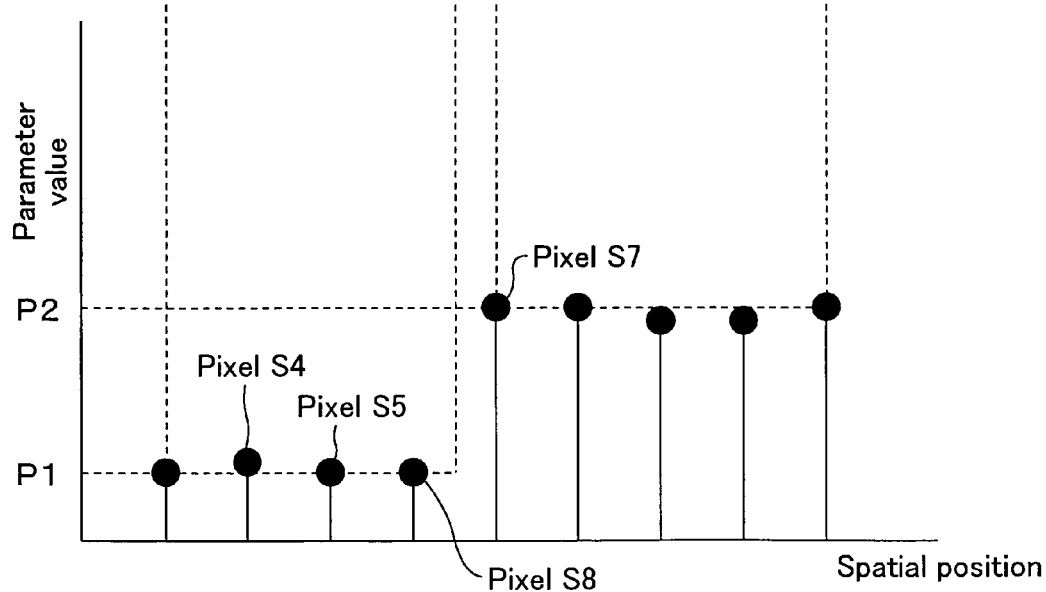

FIG. 17
(a)
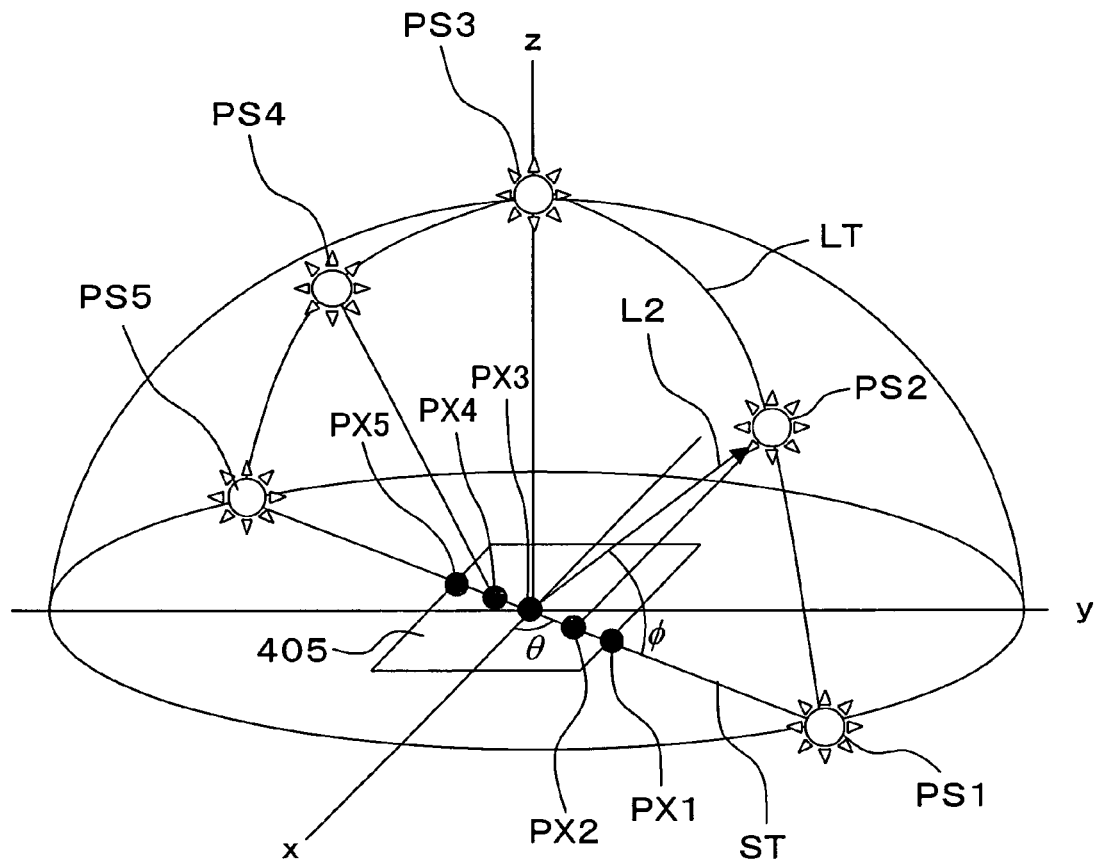
(b)
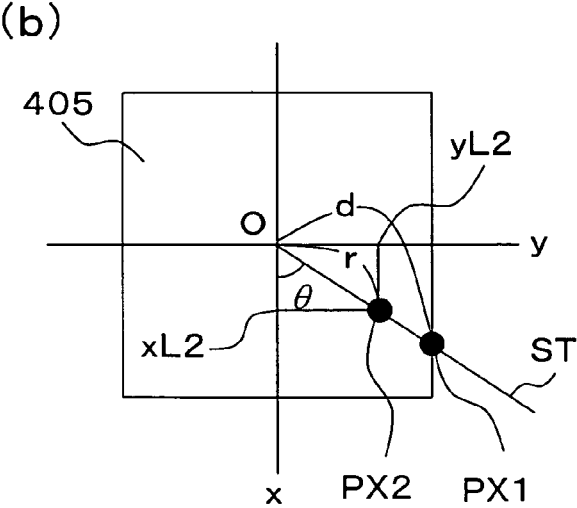
(c)
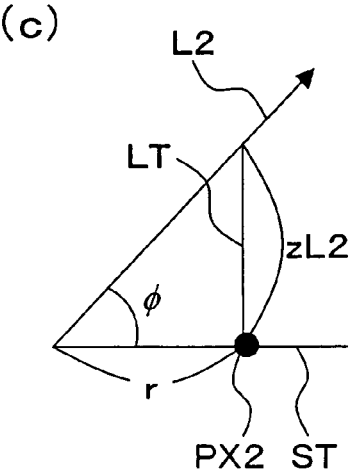

FIG. 18
(a) Angle DAG is small
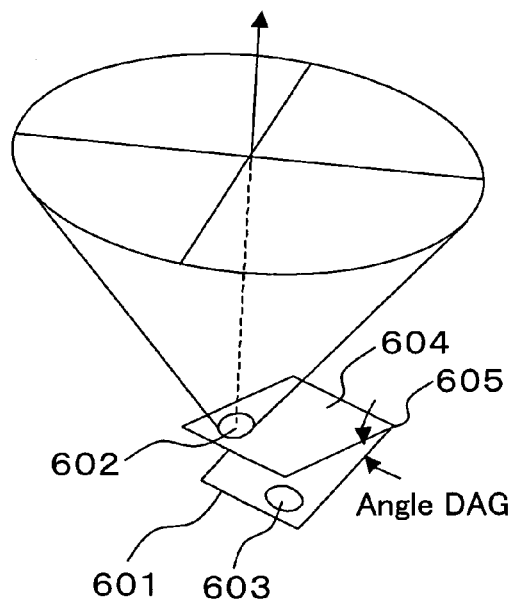
(b) Angle DAG is medium
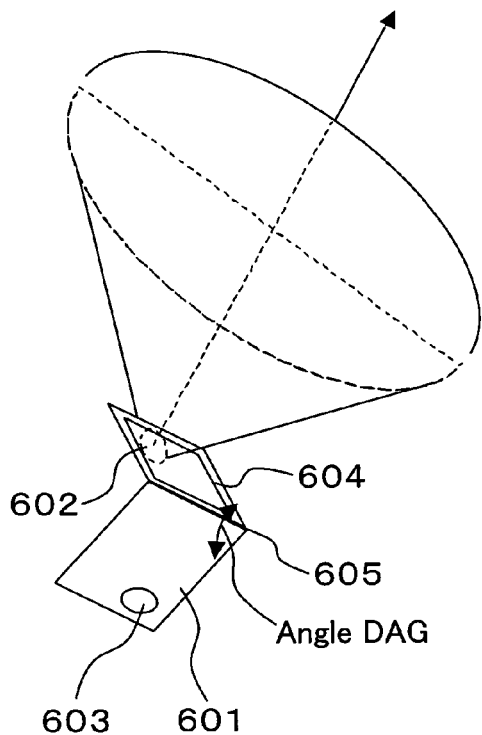
(c) Angle DAG is large
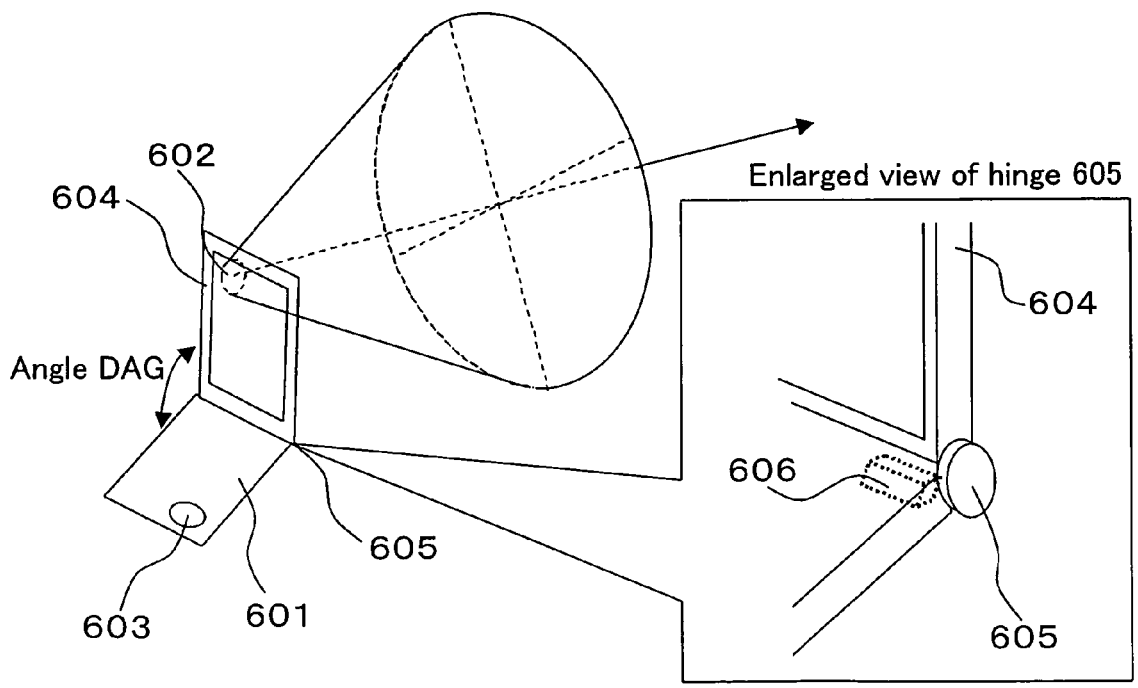
Enlarged view of hinge 605

METHOD, DEVICE, AND PROGRAM FOR IMAGE CONVERSION, METHOD, DEVICE AND PROGRAM FOR TEXTURE MAPPING, AND SERVER-CLIENT SYSTEM

CROSS-REFERENCE TO RELATED APPLICATIONS

This is a continuation application of PCT/JP2005/021687 filed on Nov. 25, 2005 and claims priority under 35 U.S.C. §119(a) on Japanese Patent Application No. 2004-354274 filed on Dec. 7, 2004. In this specification, the entire contents of these prior applications are hereby incorporated by reference.

BACKGROUND OF THE INVENTION

1. Technical Field

The present invention relates to an image processing technique and specifically to a technique for realizing image conversion, such as upsizing, downsizing, and the like, image compression, and texture mapping.

2. Background Art

Due to digitalization of image-related devices and networks, connection of any image-related devices has been possible, and the flexibility of image exchange has been improving. Further, an environment for users to freely handle images (pictures) without being restricted by difference in system has been constructed. For example, users can print images captured by a digital still camera, lay open the images on a network, and view the images on a household television set.

In the meanwhile, systems need to comply with various image formats and, naturally, a higher technique is required in image format conversions. For example, conversion of image size frequently occurs and, in such a case, an up-converter (converter for increasing the number of pixels or the number of lines) and down-converter (converter for decreasing the number of pixels or the number of lines) are necessary. For example, in the case of printing an image with the resolution of 600 dpi on an A4 (297 mm×210 mm) paper, a document of 7128 pixels×5040 lines is necessary, but many digital still cameras are short of this size, and therefore, an up-converter is necessary. On the other hand, an image laid open on a network does not have a definite final output form. Therefore, every time an output device is selected, the image needs to be converted to have an image size compliant with the selected output device. As for the household television set, since digital terrestrial broadcasting services have been started, conventional standard television images and HD (High Definition) television images are mixed. Thus, conversion of image size is frequently carried out.

If there are various image sizes, the significance of scalability in image compression becomes higher. The scalability means, in some cases, extracting standard television image data and, in other cases, extracting HD television image data from one bit stream. In other words, the scalability means the flexibility in extracting image data of various image sizes. If the scalability is secured, it is not necessary to prepare a transmission path for every format, and only a small transmission capacity is required.

Image conversion, such as image upsizing, image downsizing, and the like, is frequently employed for texture mapping in computer graphics (designs and patterns appearing on a photograph subject are generically referred to as "texture(s)"). Texture mapping is a method for expressing the patterns and textures on the surface of an object by placing two-dimensional images over the surface of a three-dimensional object created in a computer. To place the two-dimensional images so as to comply with the direction of the surface of the three-dimensional object, it is necessary to carry out processes, such as upsizing, downsizing, deformation, rotation, etc., on the two-dimensional images (see non-patent document 1).

Conventionally, the processes, such as image upsizing, image downsizing, image compression, etc., take advantage of the difference in brightness among a plurality of pixels.

In image upsizing, brightness values are interpolated according to a bilinear method, bicubic method, or the like, in order to newly generate image data which does not exist at the time of sampling (see non-patent document 1). In interpolation, only intermediate values of sampling data can be generated, and therefore, the sharpness of an edge, or the like, shows a tendency to deteriorate. In view of such, there has been a technique wherein an interpolated image is used as an initial upsized image and, thereafter, an edge portion is extracted to emphasize only the edge (disclosed in non-patent documents 2 and 3). Especially in non-patent document 3, multi-resolution representation and Lipschitz index are employed, such that an edge is selectively emphasized according to the sharpness of the edge.

In image downsizing, some pixels are deleted. If pixels which are at separate positions before downsizing are placed adjacent to each other, continuity is marred so that moire fringes occur. To avoid such a problem, in general, the data is subjected to a low-pass filter before some pixels are deleted to obtain a smooth brightness variation, and thereafter the some pixels are deleted.

In image compression, a high correlation in brightness between adjacent pixels is utilized. To express the correlation in brightness, a spatial frequency component is divided into quadrature components. In general, discrete cosine transform is utilized for orthogonal transformation, and energy is concentrated at low-frequency terms because of high correlation in brightness between adjacent pixels. Thus, high-frequency terms are deleted, whereby image information is compressed (see non-patent document 4).

[Patent Document 1] Japanese Laid-Open Patent Publication No. 2005-149390.

[Non-patent Document 1] Shinji Araya, *Clear commentary on 3D computer graphics*, Kyoritsu Shuppan Co., Ltd., pp. 144-145, Sep. 25, 2003.

[Non-patent Document 2] H. Greenspan, C. H. Anderson, "Image enhancement by non-linear extrapolation in frequency space", SPIE Vol. 2182 Image and Video Processing II, 1994.

[Non-patent Document 3] Makoto Nakashizu, et al., "Increase in resolution of image in multi-scale brightness gradient plane", The IEICE transactions (Japanese Edition), D-II Vol. J81-D-II No. 10 pp. 2249-2258, October 1998.

[Non-patent Document 4] *Broadband+Mobile Standard MPEG textbook: Point-by-point illustration* edited by Multimedia Communication Study Group, ASCII Corporation, pp. 25-29, Feb. 11, 2003.

[Non-patent Document 5] *Image Processing Handbook* edited by Image Processing Handbook Editorial Committee, Shokodo Co., Ltd., pp. 393, Jun. 8, 1987.

[Non-patent Document 6] Shinji Umeyama, "Separation of diffuse and specular components of surface reflection—using multiple observations through a polarizer and probabilistic independence property", Symposium on image recognition and understanding 2002, pp. I-469-pp. I-476, 2002.

SUMMARY OF THE INVENTION

However, the conventional techniques have the following problems.

As described above, in the case where image upsizing, image downsizing, image compression, etc., are carried out using the difference in brightness among pixels, it is difficult to separate edge components and noise, and as a result, there is a high possibility that the image quality is deteriorated by the image conversion.

In the image upsizing, an edge portion of an initial upsized image which has been blurred by interpolation is emphasized. Thus, there is a possibility that noise is also emphasized together with the edge portion, and the image quality deteriorates. In the image compression, noise deteriorates the correlation between adjacent pixels and thus constitutes a cause of deterioration in compression efficiency. Edge emphasis of interpolated images in image upsizing and smoothing in image downsizing are empirical methods and do not have any definite countermeasure against noise. Thus, the image quality is not assured in converted images.

In view of the above problems, an objective of the present invention is to improve noise resistance in image conversion, image compression, and texture mapping so that the image quality becomes more stable as compared with the conventional techniques.

According to the present invention, there is provided an image conversion method comprising: acquiring, for each pixel of the first image, values of a plurality of parameters included in a predetermined illumination equation which defines a brightness; specifying, for each of the parameters, a homogeneous region including pixels which are similar in value of the parameter; converting each of the parameters, in each of the specified homogeneous region, according to details of an image conversion; and determining the brightness of each pixel of a second image using the values of the parameters obtained after the conversion.

In the above invention, a plurality of parameters included in an illumination equation which defines the brightness are acquired for the first image which is subjected to an image conversion. Herein, the parameters include, for example, the optical characteristics of a photograph subject, the environmental conditions, the surface normal of the photograph subject, etc. Homogeneous regions are specified for each parameter, and the parameter is converted in each of the specified homogeneous regions according to details of the image conversion. The brightness of each pixel in a second image obtained after the image conversion is determined using the values of the parameters obtained after the conversion.

Specifically, the brightness is separated into illumination equation parameters, and an image conversion is carried out using a correlation among pixels for each of the parameters. The illumination equation parameters have high independence as do the surface normal and optical characteristics, for example. Therefore, when the process is carried out on a parameter-by-parameter basis, the specific characteristics of noise can be grasped easily as compared with a case where the process is carried out using a brightness which is given in the form of the integral value of the parameter. Further, since the optical characteristics can be separated into a diffuse reflection component and a mirror reflection component which are highly-independent factors. Thus, the specific characteristics of noise are made outstanding. A homogeneous region is specified based on the similarity in an illumination equation parameter which is a physical characteristic of a photograph subject, i.e., a homogeneous region is determined with physical supports. Since the image conversion is carried out on each parameter for every homogeneous region, an edge portion is maintained as a boundary condition between homogeneous regions. Therefore, the image conversion can be realized with stable image quality while the sharpness of edges and texture are maintained. Furthermore, it is not necessary to directly detect an edge as required in the conventional techniques, and therefore, a problem of noise contamination does not arise.

In the above image conversion method of the present invention, in the case of image upsizing, the conversion of each parameter may be a process of increasing the density of the parameter. As described above, according to the present invention, it can be said that a homogeneous region is determined with physical supports. Therefore, the present invention, in which the density of the parameter is increased in each homogeneous region, is objective so as to be capable of stabilizing the quality of an upsized image as compared with conventional empirical techniques wherein an interpolated initial upsized image is subjected to edge emphasis.

In the above image conversion method of the present invention, in the case of image downsizing, the conversion of each parameter may be a process of decreasing the density of the parameter. As is for the image upsizing, the present invention, in which the density of the parameter is decreased in each homogeneous region, is objective so as to be capable of stabilizing the quality of a downsized image as compared with conventional empirical techniques which use a low-pass filter.

According to the present invention, there is provided an image compression method comprising: acquiring, for each pixel of an image, a plurality of parameters included in a predetermined illumination equation which defines a brightness; specifying, for each of the parameters, a homogeneous region including pixels which are similar in value of the parameter; and compressively encoding each of the parameters in each of the specified homogeneous region.

In the above invention, a plurality of parameters included in an illumination equation which defines the brightness are acquired for an image which is subjected to the image compression. Homogeneous regions are specified for each parameter, and the parameter is compressively encoded in each of the specified homogeneous regions. In a homogeneous region, the correlation in an illumination equation parameter among adjacent pixels is high. Therefore, the compression efficiency is improved as compared with an image compression which is carried out based on the brightness value. Further, an edge portion is maintained as a boundary condition between homogeneous regions. Therefore, the image compression can be realized with high compression efficiency while the sharpness of edges and texture are maintained.

According to the present invention, there is provided a texture mapping method, comprising: the preprocessing of placing a texture image on a 3-dimensional CG model object; acquiring, for each pixel of the texture image placed on the object, values of a plurality of parameters included in a predetermined illumination equation which defines a brightness; specifying, for each of the parameters, a homogeneous region including pixels which are similar in value of the parameter; converting each of the parameters, in each of the specified homogeneous region, according to details of a predetermined image conversion; and determining the brightness of each pixel in an image of the object using the values of the parameters obtained after the conversion.

According to the above invention, texture mapping can be realized with stable image quality while the sharpness of edges and texture are maintained as are in the above-described image conversion method.

According to the present invention, a conversion process is performed on each of illumination equation parameters which constitute the brightness value in each homogeneous region. Thus, texture mapping can be realized with stable image quality while the sharpness of edges and texture are maintained. Further, image compression can be realized with high compression efficiency while the sharpness of edges and texture are maintained.

BRIEF DESCRIPTION OF THE DRAWINGS

FIG. 10A and FIG. 10B illustrate the process of increasing the density of a parameter for image upsizing.

FIG. 11A and FIG. 11B illustrate the process of decreasing the density of a parameter for image downsizing.

FIG. 17A, FIG. 17B and FIG. 17C illustrate the relationship between the position of a light source and an image captured through a wide angle lens.

FIG. 18A, FIG. 18B and FIG. 18C illustrate the third structure example for implementing the present invention in which a foldable mobile phone is used.

DESCRIPTION OF THE PREFERRED EMBODIMENTS

Figure 1:
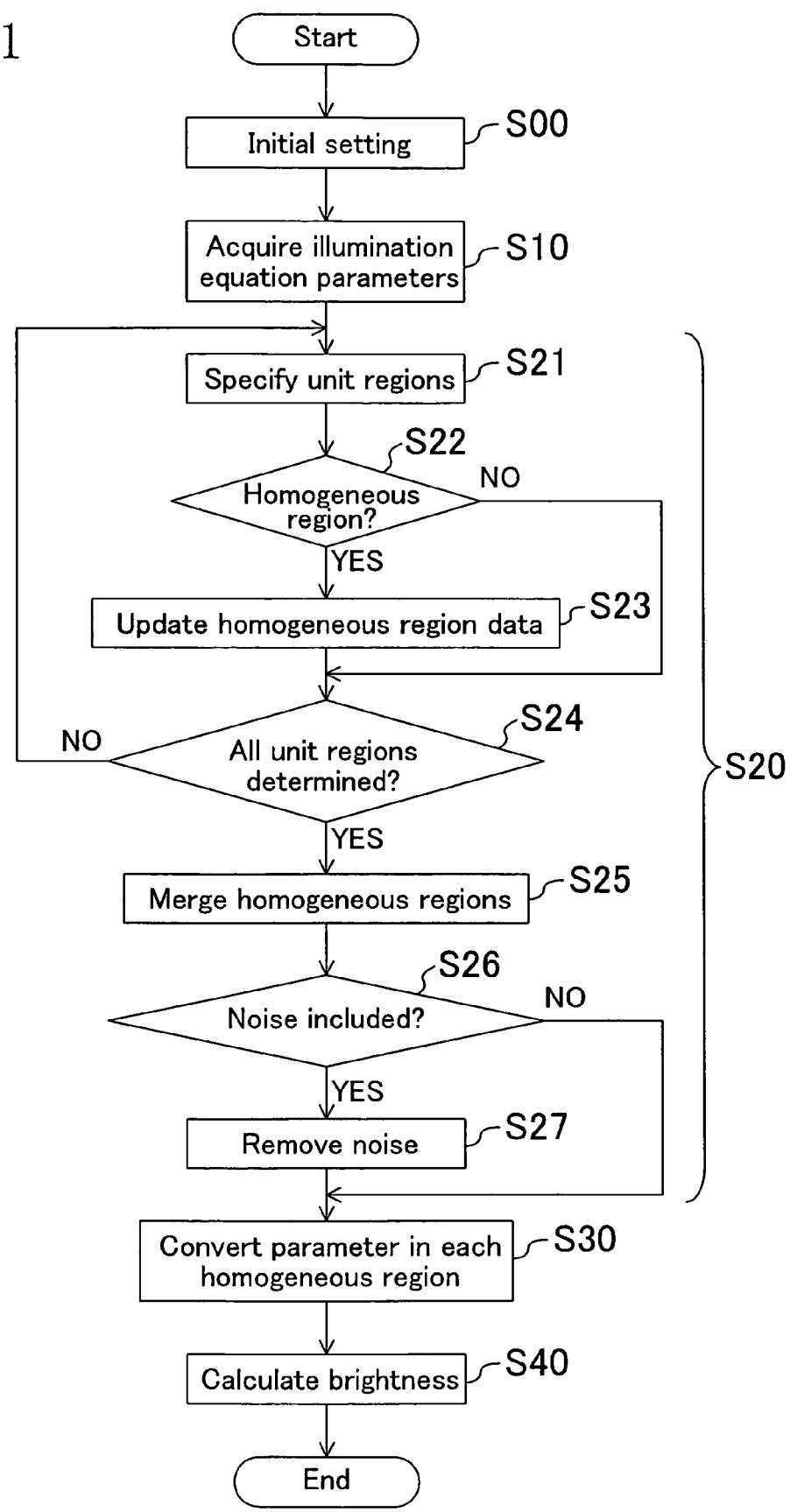
FIG. 1 is a flowchart illustrating an image conversion method according to embodiment 1 of the present invention.

According to the first aspect of the present invention, there is provided an image conversion method for performing a predetermined image conversion on a first image to generate a second image, comprising: a first step of acquiring, for each pixel of the first image, values of a plurality of parameters included in a predetermined illumination equation which defines a brightness; a second step of specifying, for each of the parameters, a homogeneous region including pixels which are similar in value of the parameter; a third step of converting the values of each of the parameters for pixels of the first image, in each of the homogeneous region specified at the second step, according to details of the predetermined image conversion; and a fourth step of determining the brightness of each pixel of the second image using the values of the parameters obtained after the conversion of the third step.

According to the second aspect of the present invention, the predetermined image conversion is image upsizing; and the conversion of the third step is a process of increasing a density of the parameter.

According to the third aspect of the present invention, the predetermined image conversion is image downsizing; and the conversion of the third step is a process of decreasing a density of the parameter.

According to the fourth aspect of the present invention, the first step of acquiring the plurality of parameters includes measuring the parameters from a photograph subject or estimating the parameters from the first image.

According to the fifth aspect of the present invention, the second step includes evaluating a similarity among the plurality of pixels using a variance in the value of the parameter among the pixels.

According to the sixth aspect of the present invention, the second step includes removing noise from the specified homogeneous region.

According to the seventh aspect of the present invention, there is provided a device for performing a predetermined image conversion on a first image to generate a second image, comprising: a parameter acquiring section for acquiring, for each pixel of the first image, values of a plurality of parameters included in a predetermined illumination equation which defines a brightness; a homogeneous region specifying section for specifying, for each of the parameters, a homogeneous region including pixels which are similar in value of the parameter; a parameter converter for converting the values of each of the parameters for pixels of the first image, in each of the homogeneous region specified by the homogeneous region specifying section, according to details of the predetermined image conversion; and a brightness calculating section for calculating the brightness of each pixel of the second image using the values of the parameters obtained after the conversion of the parameter converter.

According to the eighth aspect of the present invention, there is provided a server-client system for performing an image conversion, comprising: a server which includes the parameter acquiring section, the homogeneous region specifying section, and the parameter converter of the seventh aspect; and a client which includes the brightness calculating section of the seventh aspect, wherein the client instructs the server of details of the image conversion.

According to the ninth aspect of the present invention, there is provided a program which instructs a computer to perform a method for performing a predetermined image conversion on a first image to generate a second image, the method comprising: a first step of acquiring, for each pixel of the first image, values of a plurality of parameters included in a predetermined illumination equation which defines a brightness; a second step of specifying, for each of the parameters, a homogeneous region including pixels which are similar in value of the parameter; a third step of converting the values of each of the parameters for pixels of the first image, in each of the homogeneous region specified at the second step, according to details of the predetermined image conversion; and a fourth step of determining the brightness of each pixel of the second image using the values of the parameters obtained after the conversion of the third step.

According to one of the other aspects of the present invention, there is provided a texture mapping method, comprising: a preprocessing step of placing a texture image on a 3-dimensional CG model object; a first step of acquiring, for each pixel of the texture image placed on the object, values of a plurality of parameters included in a predetermined illumination equation which defines a brightness; a second step of specifying, for each of the parameters, a homogeneous region including pixels which are similar in value of the parameter; a third step of converting the values of each of the parameters for pixels of the texture image, in each of the homogeneous region specified at the second step, according to details of a predetermined image conversion; and a fourth step of determining the brightness of each pixel in an image of the object using the values of the parameters obtained after the conversion of the third step.

According to one of the other aspects of the present invention, there is provided a texture mapping device, comprising: a preprocessing section for placing a texture image on a 3-dimensional CG model object; a parameter acquiring section for acquiring, for each pixel of the texture image placed on the object, values of a plurality of parameters included in a predetermined illumination equation which defines a brightness; a homogeneous region specifying section for specifying, for each of the parameters, a homogeneous region including pixels which are similar in value of the parameter; a parameter converter for converting the values of each of the parameters for pixels of the texture image, in each of the homogeneous region specified by the homogeneous region specifying section, according to details of a predetermined image conversion; and a brightness calculating section for calculating the brightness of each pixel in an image of the object using the values of the parameters obtained after the conversion of the parameter converter.

According to one of the other aspects of the present invention, there is provided a texture mapping program which instructs a computer to perform the following steps: a preprocessing step of placing a texture image on a 3-dimensional CG model object; a first step of acquiring, for each pixel of the texture image placed on the object, values of a plurality of parameters included in a predetermined illumination equation which defines a brightness; a second step of specifying, for each of the parameters, a homogeneous region including pixels which are similar in value of the parameter; a third step of converting the values of each of the parameters for pixels of the texture image, in each of the homogeneous region specified at the second step, according to details of a predetermined image conversion; and a fourth step of determining the brightness of each pixel in an image of the object using the values of the parameters obtained after the conversion of the third step.

Hereinafter, embodiments of the present invention will be described with reference to the drawings.

Embodiment 1

FIG. 1 is a flowchart illustrating an image conversion method according to embodiment 1 of the present invention. The image conversion method of embodiment 1 can be implemented by executing a program for carrying out the method, which is stored in a computer-readable medium, on a computer.

In embodiment 1, the formulae shown below are used as the illumination equations which define the brightness, and a homogeneous region is specified for each of a plurality of parameters included in these formulae. In each homogeneous region, the parameter is subjected to a conversion process, whereby a predetermined image conversion is realized.

$$I_v = \rho_a I_a + I_i (\overline{N} \cdot \overline{L}) d\omega (k_d \rho_d + k_s \rho_s) \quad \text{Formula (1)}$$

$$\rho_s = \frac{F_\lambda}{\pi} \frac{DG}{(\overline{N} \cdot \overline{V})(\overline{N} \cdot \overline{L})} \quad \text{Formula (2)}$$

$$D = \frac{1}{4m^2 \cos^4 \beta} e^{-[(\tan\beta)/m]^2}$$

$$G = \min\left\{1, \frac{2(\overline{N} \cdot \overline{H})(\overline{N} \cdot \overline{V})}{(\overline{V} \cdot \overline{H})}, \frac{2(\overline{N} \cdot \overline{H})(\overline{N} \cdot \overline{L})}{(\overline{V} \cdot \overline{H})}\right\}$$

$$F_\lambda = \frac{1}{2} \frac{(g-c)^2}{(g+c)^2}\left(1 + \frac{[c(g+c)-1]^2}{[c(g-c)+1]^2}\right)$$

$$g^2 = n^2 + c^2 - 1$$

$$c = (\overline{L} \cdot \overline{H})$$

In the above formulae, $I_a$ is the brightness of ambient light, $\rho_a$ is the reflectance of ambient light, $I_i$ is the brightness of illumination, vector N is the surface normal vector, vector L is the light source vector which represents the light source direction, $d\omega$ is the solid angle of the light source, $\rho_d$ is the bidirectional reflectance of the diffuse reflection component, $\rho_s$ is the bidirectional reflectance of the mirror reflection component, $F_\lambda$ is the Fresnel coefficient, m is the microfacet distribution, and n is the refractive index. Further, $k_d$ is the ratio of the diffuse reflection component, and $k_s$ is the ratio of the mirror reflection component, which are in the relationship of $k_d + k_s = 1$. Vector H is a half vector which exists at the midpoint between light source vector L and viewpoint vector V. $\beta$ is an angle formed by surface normal vector N and viewpoint vector V, which can be calculated from light source vector L, surface normal vector N, and viewpoint vector V.

Figure 2:
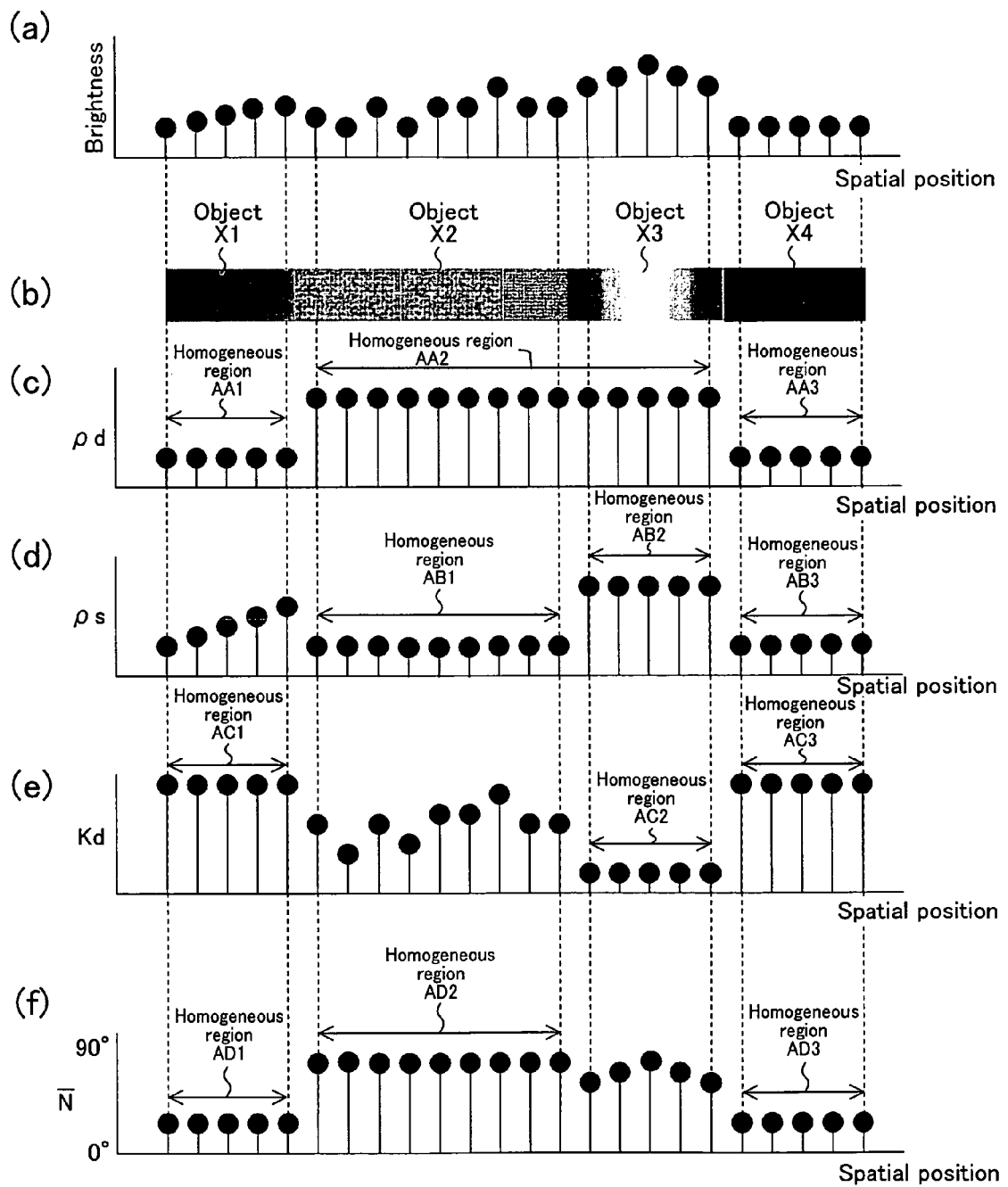
FIG. 2A to FIG. 2F schematically illustrate the relationship between the brightness and illumination equation parameters.

FIG. 2A to FIG. 2F schematically illustrate the relationship between the brightness and illumination equation parameters. FIG. 2A is a graph which shows the distribution of brightness in an image shown in FIG. 2B. FIG. 2C to FIG. 2F are graphs which show the distributions of the illumination equation parameters, bidirectional reflectance $\rho_d$ of the diffuse reflection component, bidirectional reflectance $\rho_s$ of the mirror reflection component, diffuse reflection component ratio $k_d$, and surface normal vector N, respectively. In the graphs of FIG. 2A and FIG. 2C to FIG. 2F, the horizontal axis represents the spatial position, and the vertical axis represents the brightness or the value of each parameter.

In the image of FIG. 2B, there are four types of objects X1 to X4. Object X1 has a brightness distribution which becomes brighter gradually from left to right. Object X2 has a random brightness distribution which does not have regularity. Object X3 has a brightness distribution which includes a highlight portion at the center. Object X4 has a brightness distribution which is uniform at all of the spatial positions.

In the range of object X1, bidirectional reflectance $\rho_d$ of the diffuse reflection component, diffuse reflection component ratio $k_d$, and surface normal vector N have the homogeneous regions (AA1, AC1, AD1), while only bidirectional reflectance $\rho_s$ of the mirror reflection component varies. The variation of bidirectional reflectance $\rho_s$ causes a variation in brightness. In the range of object X2, bidirectional reflectance $\rho_d$ of the diffuse reflection component, bidirectional reflectance $\rho_s$ of the mirror reflection component, and surface normal vector N have the homogeneous regions (AA2, AB1, AD2), while only diffuse reflection component ratio $k_d$ varies. Diffuse reflection component ratio $k_d$ exhibits a random variation which does not have regularity, and the brightness also varies randomly, whereby a fine texture is formed.

In the range of object X3, bidirectional reflectance $\rho_d$ of the diffuse reflection component, bidirectional reflectance $\rho_s$ of the mirror reflection component, and diffuse reflection component ratio $k_d$ have the homogeneous regions (AA2, AB2, AC2), while only surface normal vector N varies. The variation of surface normal vector N causes a variation in brightness. In the range of object X4, parameters $\rho_d$, $\rho_s$, $k_d$, and N all have the homogeneous regions (AA3, AB3, AC3, AD3), and therefore, the brightness value is constant. The brightness value is low in the range of object X4 because diffuse reflection component ratio $k_d$ is high so that the diffuse reflection component is mainly contained (FIG. 2E) while bidirectional reflectance $\rho_d$ of the diffuse reflection component is low (FIG. 2C).

In a conventional image upsizing process described in non-patent documents 2 and 3, an edge is detected by a variation in brightness shown in FIG. 2A, and the detected edge is emphasized. In this case, edge extraction based on the brightness variation has a difficulty in separation from noise, so that noise is also emphasized through the edge emphasis.

As seen from formula (1), if at least one parameter included in the illumination equation is changed, the brightness varies. In view of such, it is understood that detection of an edge is stably carried out on a parameter-by-parameter basis rather than based on the variation in brightness. In embodiment 1, an edge occurs at the boundary between different homogeneous regions, and therefore, the edge can be determined more stably based on a parameter for which homogeneous regions are determined more stably. Therefore, by converting each parameter in each homogeneous region, an image conversion can be carried out with the sharpness of an edge and the texture being maintained.

Returning to the flowchart of FIG. 1, at step S00, the initial setting is carried out. Herein, the first image, which is a subject of an image conversion, is acquired, and the threshold value for determination of homogeneous regions, THEPR, the threshold value for determination of homogeneous region merger, THMEPR, and the threshold value for noise determination, THN, are set. How to use these threshold values will be described later.

At step S10 (first step), as for each pixel of the first image, values of a plurality of parameters included in predetermined illumination equations are acquired. Herein, the illumination equations of formulae (1) and (2) are used. Herein, the brightness of ambient light, $I_a$, the reflectance of ambient light, $\rho_a$, the brightness of the light source, $I_i$, light source vector L, the solid angle of the light source, $d\omega$, referred to as the environmental conditions. The bidirectional reflectance of the diffuse reflection component, $\rho_d$, the bidirectional reflectance of the mirror reflection component, $\rho_s$, the diffuse reflection component ratio, $k_d$, and the mirror reflection component ratio, $k_s$, are referred to as the optical characteristics. Based on these parameters, the brightness value of reflected light in the viewpoint direction, $I_v$, is defined according to the illumination equation of formula (1).

Figure 3:
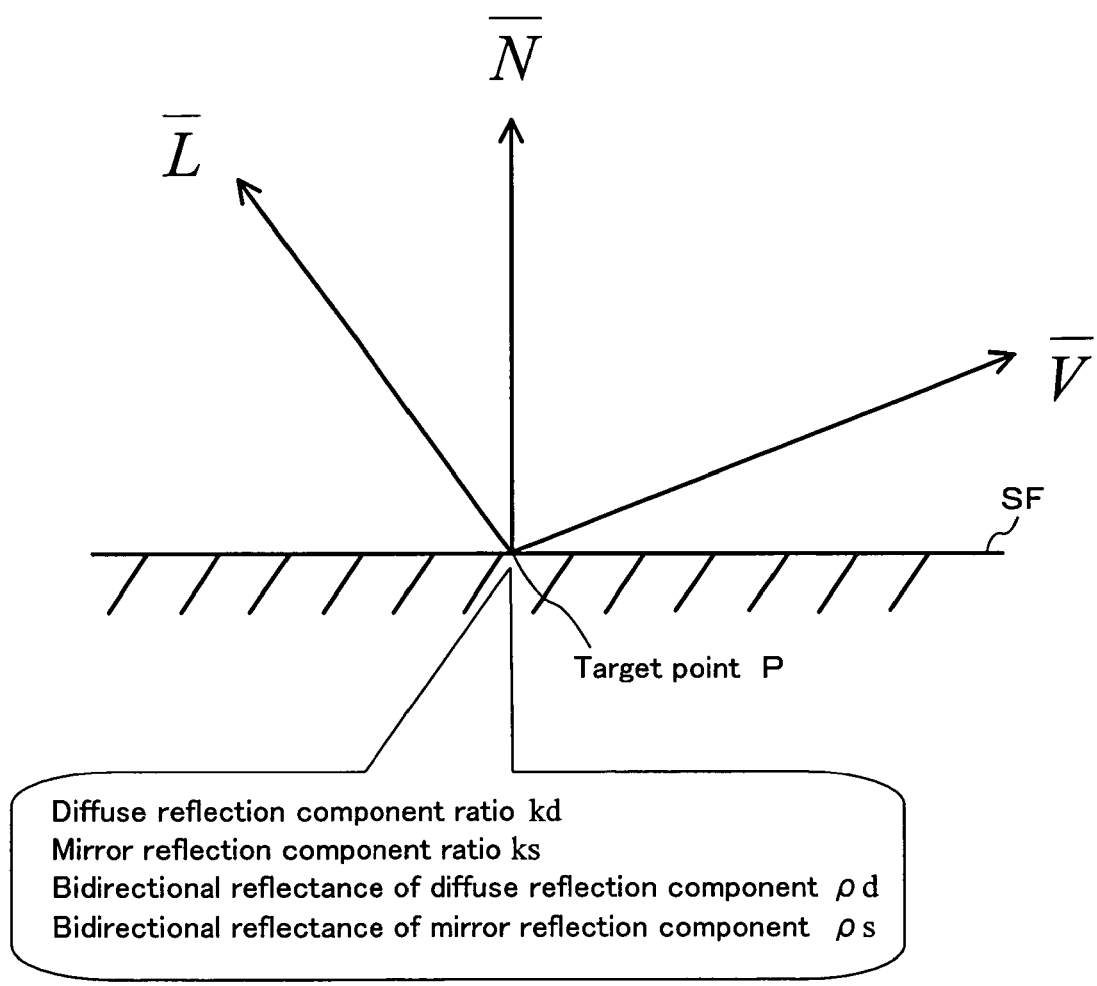
FIG. 3 is a concept diagram illustrating geometric conditions which constitute assumptions about the illumination equation.

FIG. 3 is a concept diagram illustrating geometric conditions which constitute assumptions about formula (1). As shown in FIG. 3, light from the light source falls onto an object surface SF at a current target point P with the irradiance of $I_i(N \cdot L)d\omega$. The light is reflected by the object surface SF with the diffuse reflection component of $k_d\rho_d$ and the mirror reflection component of $k_s\rho_s$. The ambient light is the light which indirectly comes via a peripheral area due to, for example, multiple reflection, onto the object surface SF at the current target point P and constitutes a bias component of brightness $I_v$ in the viewpoint direction (vector V).

It should be noted that the illumination equations and the types of parameters illustrated herein are merely exemplary. The present invention does not put any limitation on the structure of the illumination equations or the types of parameters, which may be arbitrarily determined.

Figure 4:
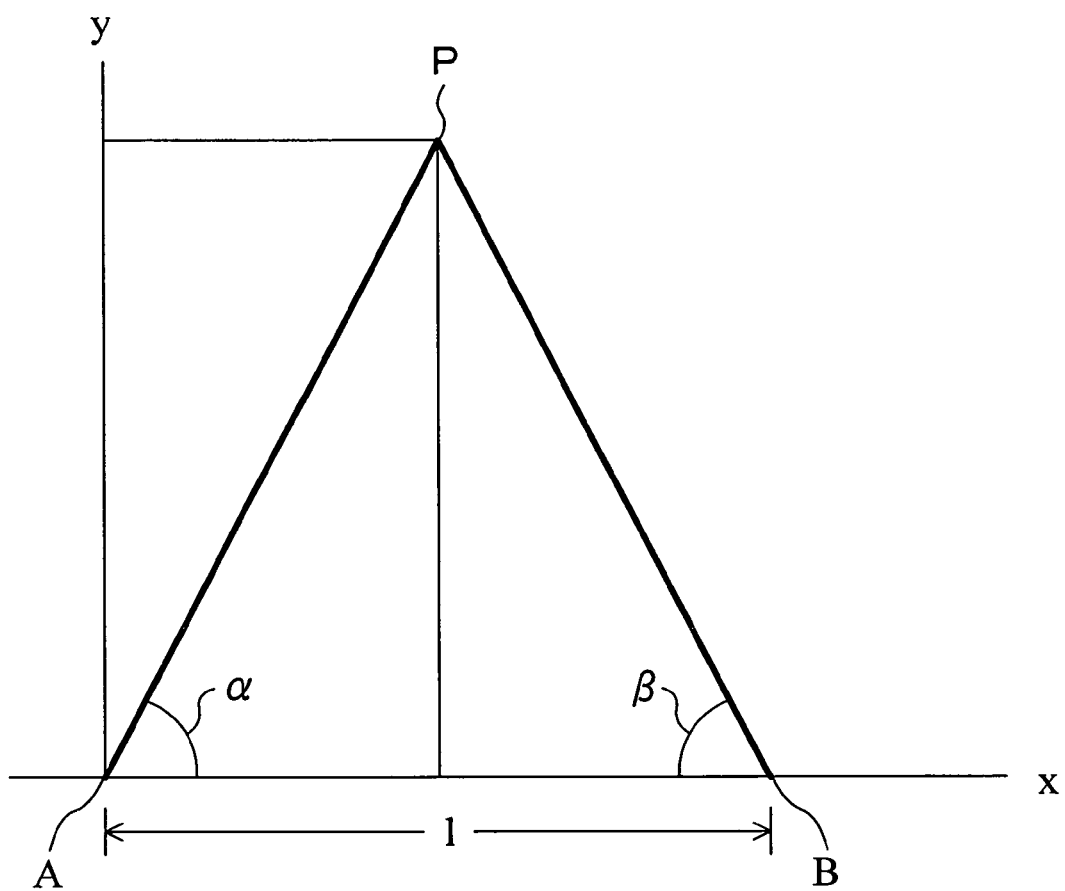
FIG. 4 illustrates an example of a method for measuring a surface normal vector.

Each parameter of formula (1) can be acquired by measurement on a photograph subject, estimation based on a given captured image, or the like. For example, surface normal vector N can be measured with a range finder, or the like, using the principle of triangulation (see, for example, non-patent document 5). The principle of triangulation uses a theorem that, if a side of a triangle and the angles at both ends of the side are determined, the triangle is uniquely determined. As shown in FIG. 4, where the angles for looking at point P from two points A and B which are separated by known distance 1 are $\alpha$ and $\beta$, respectively, the coordinates of point P (x, y) is as follows:

$$\begin{cases} x = \dfrac{l\tan\beta}{\tan\alpha + \tan\alpha} \\ y = \dfrac{l\tan\alpha\tan\beta}{\tan\alpha + \tan\alpha} \end{cases} \quad \text{Formula (3)}$$

Figure 5:
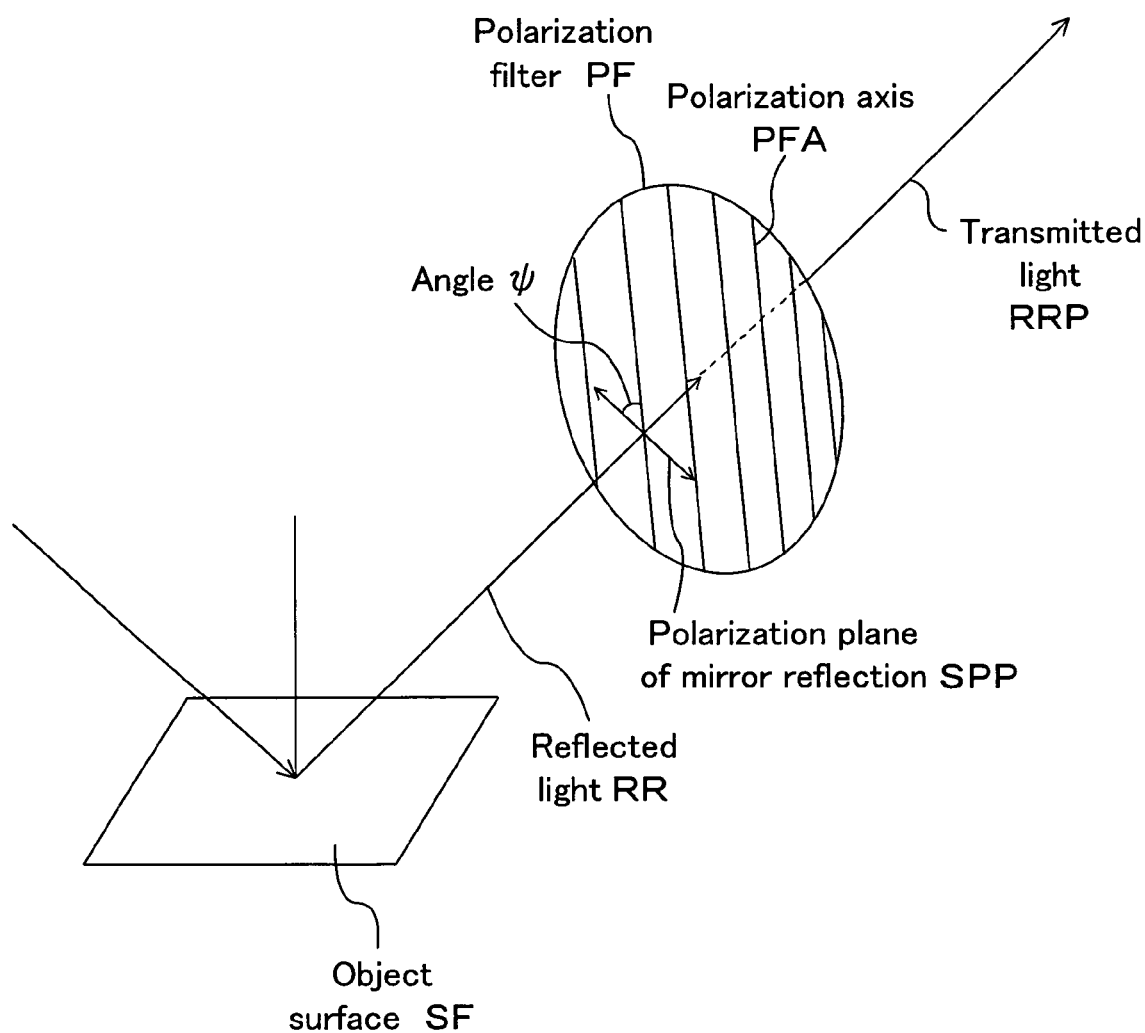
FIG. 5 illustrates an example of a method for separating diffuse reflection and mirror reflection.

As for the method for separating the diffuse reflection and the mirror reflection, for example, non-patent document 6 discloses the technique of utilizing polarization of the mirror reflection component. When light is reflected by an object surface, the Fresnel coefficient is generally different between an electric field component parallel to the incidence/reflection surface of the light and an electric field component perpendicular to the incidence/reflection surface. Therefore, the reflected light polarizes. Although the mirror reflection component polarizes in general, the diffuse reflection is irregular reflection and thus has no polarization characteristic. In the case where reflected light RR is observed through a polarization filter PF as shown in FIG. 5, the intensity of transmitted light RRP is the intensity of a component of the reflected light RR which is parallel to the polarization axis PFA of the polarization filter PF. Thus, in the case where the mirror reflection component from the object surface SF is observed while the polarization filter PF is rotated, the intensity of the transmitted light RRP varies according to angle $\psi$ between the polarization axis PFA of the polarization filter PF and a polarization plane SPP of the mirror reflection as expressed by the following formula (4):

$$L(\psi) = L_d + \frac{1}{4}\{F_V(\theta'_i) + F_P(\theta'_i) - (F_V(\theta'_i) - F_P(\theta'_i))\cos 2\psi)\}L_s \quad \text{Formula (4)}$$

where $L_d$ is the brightness of the diffuse reflection component, $L_s$ is the brightness of the mirror reflection component, $\theta'_i$ is the incident angle of light at a small reflection surface, $F_P$ is the Fresnel coefficient of a parallel field component for dielectric, and $F_V$ is the Fresnel coefficient of a perpendicular field component for dielectric.

Figure 6:
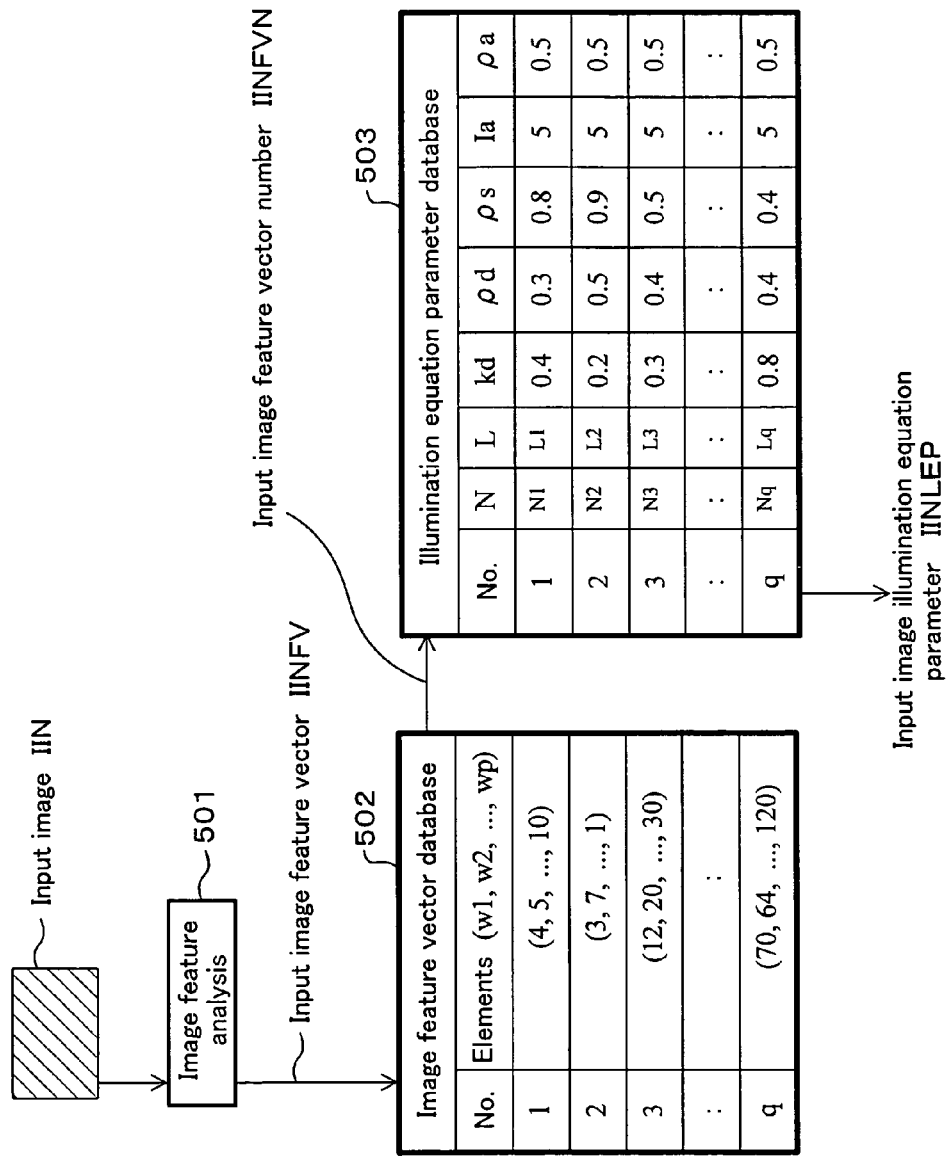
FIG. 6 illustrates a method for referring to learned data to retrieve the illumination equation parameters.

On the other hand, as for the method for estimating each parameter-based on a captured image, for example, it is effective that the relationships between the spatial response characteristics and the illumination equation parameters are learned in advance, and the leaned data is referred to at the time of acquiring the parameters. For example, as shown in FIG. 6, the relationships of image feature vectors and the illumination equation parameters are learned in advance to prepare an image feature vector database 502 and an illumination equation parameter database 503. Input image IIN (first image) is converted to input image feature vector IINFV by an image feature analysis section 501. In the image feature analysis section 501, the spatial response characteristics are obtained by, for example, wavelet transformation, or the like. The image feature vector database 502 selects an image feature vector which has the highest similarity to input image feature vector IINFV and outputs input image feature vector number IINFVN. The illumination equation parameter database 503 receives input image feature vector number IINFVN and outputs an illumination equation parameter corresponding to number IINFVN as input image illumination equation parameter IINLEP. In the case where this method is used, all of the predetermined illumination equation parameters can be acquired.

The present invention does not put any limitation on the measurement method and estimation method of parameters of the illumination equations but may employ any method. For example, surface normal vector N can be estimated by converting formula (8), which is obtained from three or more images captured with different light source directions using a photometric stereo method, to formula (9) using a generalized inverse matrix (R. J. Woodham, "Photometric method for determining surface orientation from multiple images", Optical Engineering Vol. 19, No. 1, pp. 139-144, 1980).

$$v = Lx \qquad \text{Formula (8)}$$

$$x = (L^t L)^{-1} L^t v \qquad \text{Formula (9)}$$

where vector x is the total of surface normal vectors ρdN whose length is reflectance ρd for the number of times of capturing (photo shooting), matrix L is the total of a plurality of light source vectors L for the number of times of capturing, and vector v is the total of brightness values Iv of reflected light in a plurality of viewpoint directions for the number of times of capturing. It is assumed herein that the object surface is a Lambertian surface and that the light source is a point source at infinite distance. Examples of the method for separating the diffuse reflection and the mirror reflection other than that illustrated in FIG. 5 include a method which utilizes the difference in distribution pattern between the diffuse reflection component and the mirror reflection component distributed in a 3-dimensional color space formed by RGB signals (S. Tominaga, N. Tanaka, "Estimating reflection parameters from a single color image", IEEE Computer Graphics and Applications, vol. 20, Issue 5, pp. 58-66, 2000).

Then, at step S20 (second step), for each parameter, a homogeneous region including pixels which are similar in value of the parameter is specified. Herein, the similarity of the parameter is evaluated based on the variance in the parameter in a region of a plurality of pixels. When the variance value is smaller than homogeneous region determination threshold THEPR set at step S00, the region of the plurality of pixels is determined to be a homogeneous region. When the variance value is equal to or larger than homogeneous region determination threshold THEPR set at step S00, the region of the plurality of pixels is determined not to be a homogeneous region. In this case, it is presumed that all of the pixels in the region are heterogeneous from one another or that the region includes different homogeneous regions. In any of these cases, it is presumed that an edge is included in the region. Therefore, no process is carried out on pixels not included in the homogeneous region in order to maintain the sharpness of the edge and the texture.

For example, in the case of the surface normal vector, when homogeneous, the difference in angle of vectors is small. Where homogeneous region determination threshold THEPR is set to 0.5°, for example, if the variance value is smaller than 0.5°, it is determined to be a homogeneous region. If the variance value is equal to or larger than 0.5°, it is determined to be heterogeneous. Since diffuse reflection component ratio $k_d$ is the ratio having a value between 0 and 1, homogeneous region determination threshold THEPR is set to, for example, 0.01. If the variance value is smaller than 0.01, it is determined to be a homogeneous region. If the variance value is equal to or larger than 0.01, it is determined to be heterogeneous.

Figure 7:
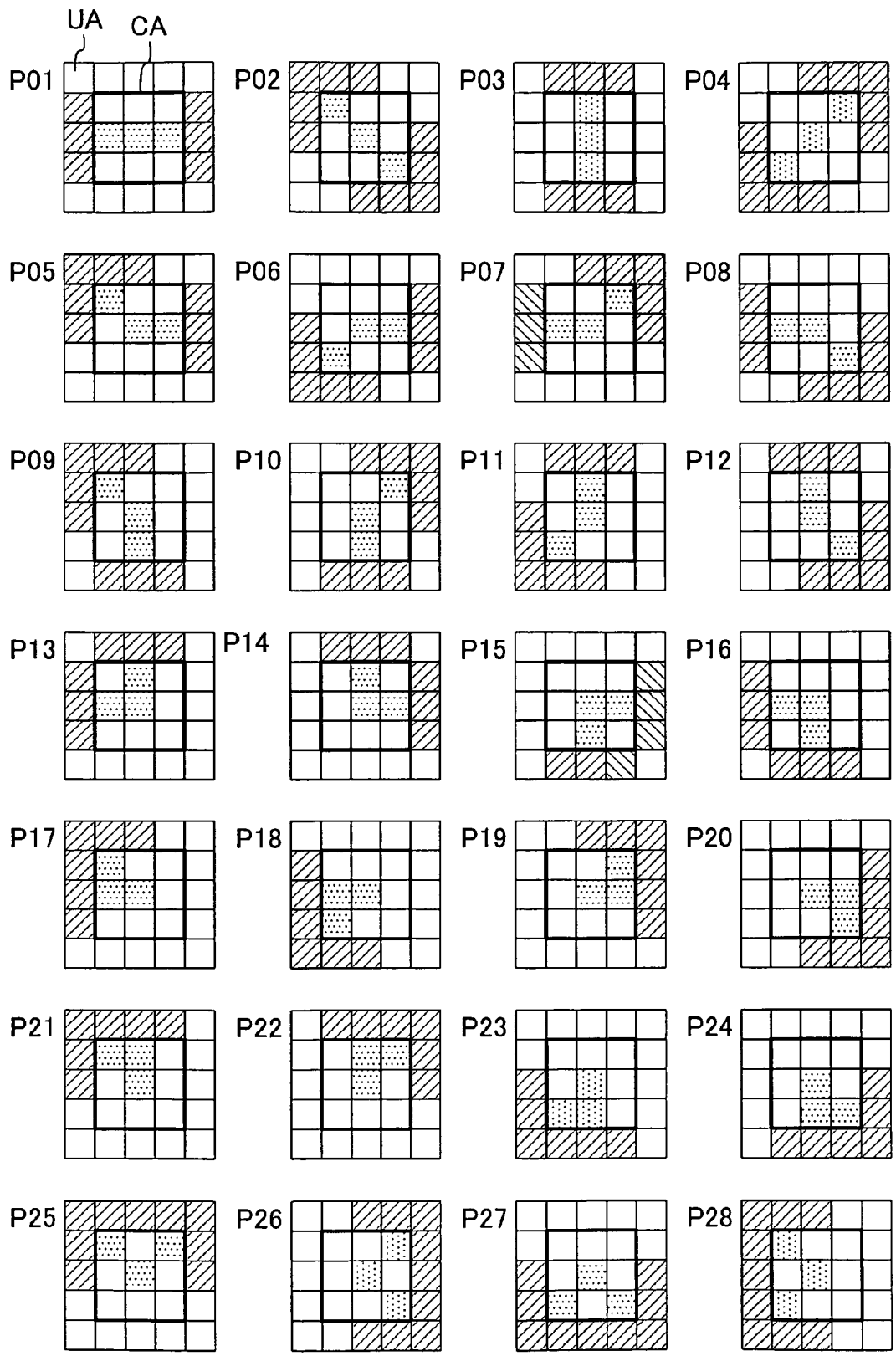
FIG. 7 shows patterns for determining a homogeneous region.

Setting of a region of a plurality of pixels for which the similarity of the parameter is determined is arbitrary but is herein carried out using a unit region of 5 pixels (vertical)×5 pixels (horizontal) (S21). In this case, the homogeneous regions can be extracted for all of the patterns in the unit region UA by carrying out 28 ypes of determinations from P01 to P28 as shown in FIG. 7. The conditions required herein are that (1) all of pixels included in a homogeneous region are adjacent to each other and that (2) the homogeneous region necessarily includes the center pixel of the unit region UA. In every one of the 28 types of patterns, the determination is carried out in two steps. First, in the central area CA of 3×3, it is determined whether or not 3 gray (dotted) pixels among 9 pixels are homogeneous. Then, as for a pattern which has been determined to be homogeneous, it is determined whether or not the 3 gray pixels and hatched pixels outside the central area CA are homogeneous. If a plurality of patterns are determined to be homogeneous regions, the sum of such patterns is determined to be a homogeneous region.

Figure 8:
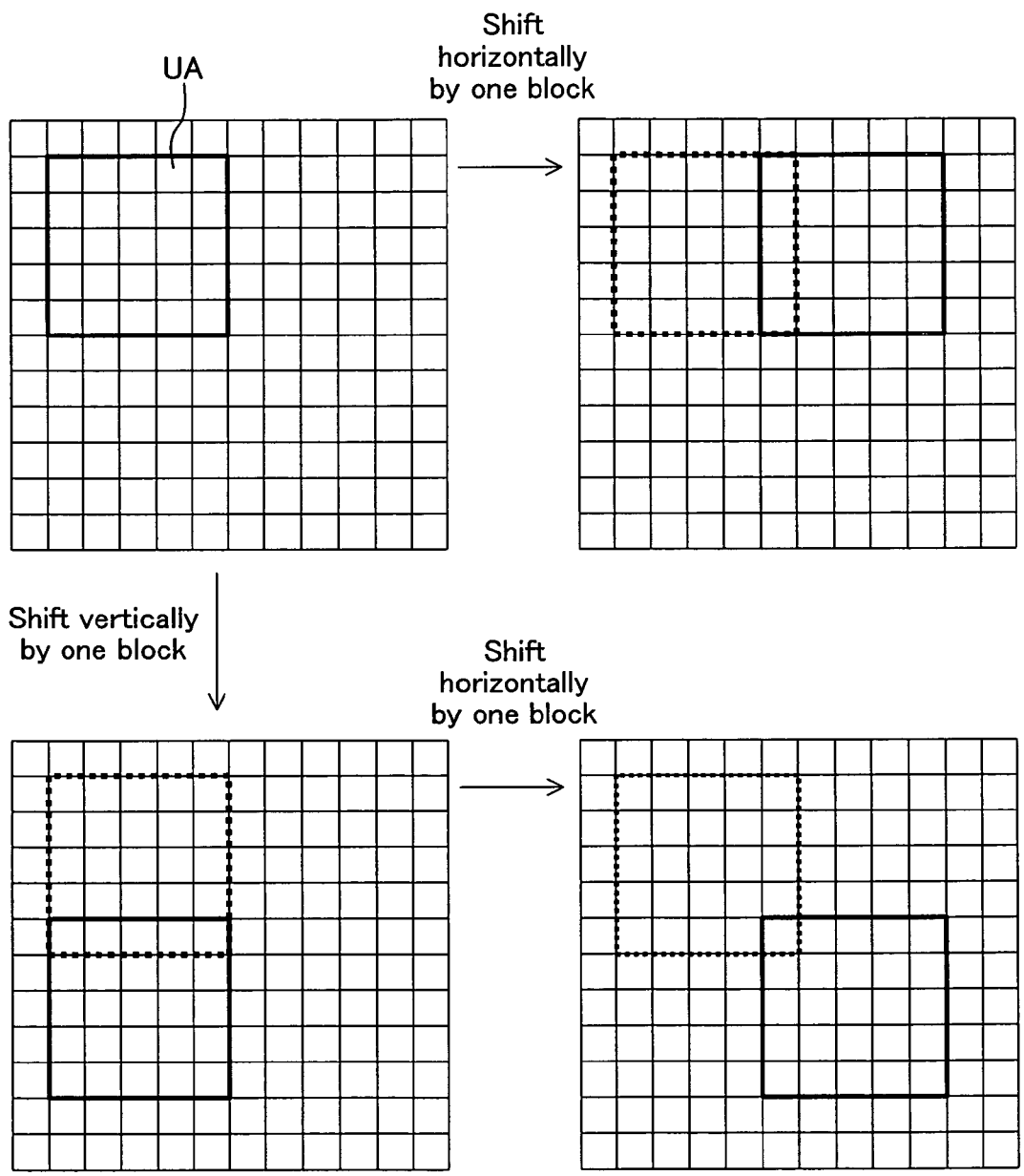
FIG. 8 illustrates an example of a method for scanning a unit region.

Through the above process, the homogeneous regions can be recognized for every one of the specified unit regions (S22). If a homogeneous region is newly recognized (Yes at S22), homogeneous region data is updated to additionally include this new homogeneous region (S23). Steps S21 to S23 are repeatedly carried out till the determination is completed for all of the unit regions (S24). By scanning the image while horizontally and vertically shifting the unit region UA of 5 pixels×5 pixels with one overlapping line as shown in FIG. 8, homogeneous regions generated with the unit region UA are spliced over the entire image.

Then, at step S25, between adjacent unit regions, the similarity between a plurality of homogeneous regions recognized in the respective unit regions is evaluated, and the similar homogeneous regions are merged. The method for evaluating the similarity of the homogeneous regions is arbitrary but may be carried out by, for example, averaging the parameter values in each unit region and carrying out the determination using the difference value of the average value. Specifically, when the difference value is smaller than homogeneous region merger determination threshold THMEPR set at step S00, the homogeneous regions are merged.

Then, at step S26, it is determined whether or not the homogeneous region includes noise. For example, this determination is carried out using the average value of the parameter values of all of the pixels in a homogeneous region as a reference such that, when the difference between the parameter value of a certain pixel and the average value is greater than noise determination threshold THN set at step S00, it is determined that the homogeneous region includes noise. When it is noise, the surface normal vector has a large difference from the average value of the angles of the vectors. Thus, for example, noise determination threshold THN is set to 30° and, if the difference from the average value is greater than 30°, it is determined that the homogeneous region includes noise. As for diffuse reflection component ratio $k_d$, for example, noise determination threshold THN is set to 0.2 and, if the difference from the average value is greater than 0.2, it is determined that the homogeneous region includes noise.

Figure 9:
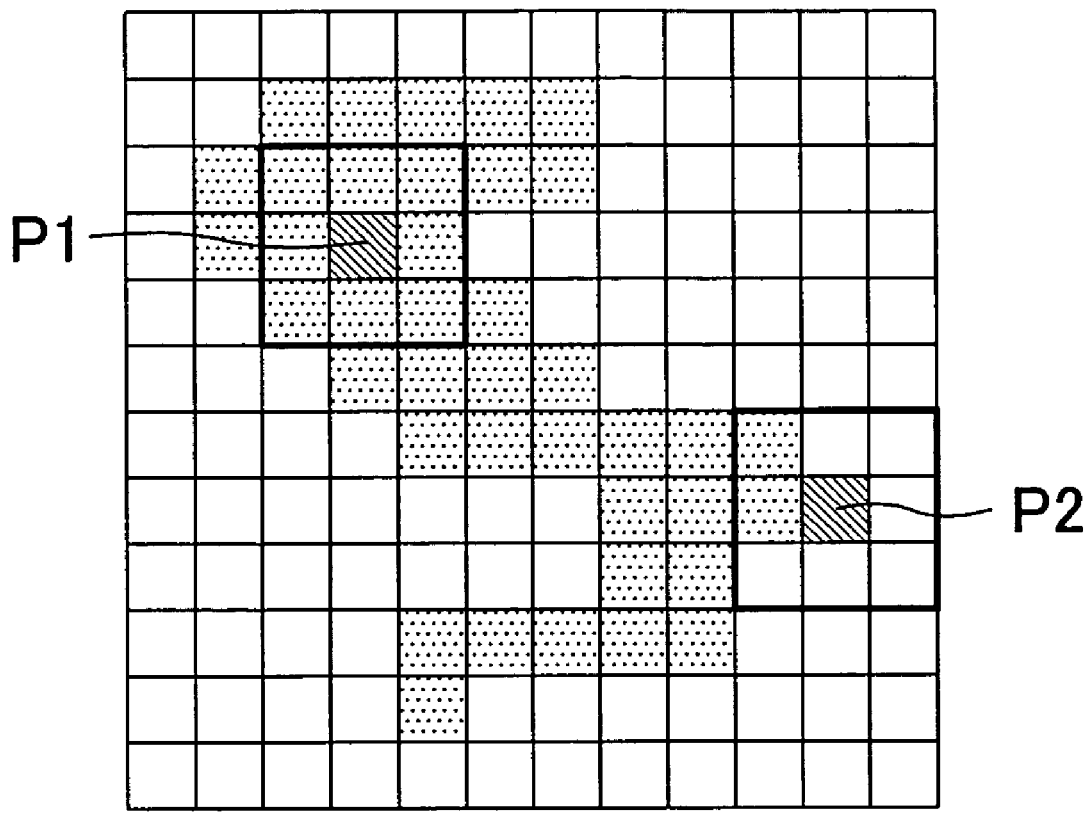
FIG. 9 illustrates an example of noise removal.

If it is determined that the homogeneous region includes noise (Yes at S26), the noise is removed from the homogeneous region at step S27. FIG. 9 illustrates an example of noise removal where gray (dotted) pixels constitute a homogeneous region and pixels P1 and P2 are determined to be noise. For example, among 8 pixels neighboring the pixel which has been determined to be noise, the average value of the parameter values of pixels included in the homogeneous region is calculated, and the noise is replaced by the average value. In the case of pixel P1, all of 8 neighboring pixels belong to the homogeneous region, and therefore, the noise of pixel P1 is replaced by the average value of the parameter values of all of the 8 neighboring pixels. In the case of pixel P2, 2 out of 8 neighboring pixels belong to the homogeneous region, and therefore, the noise of pixel P2 is replaced by the average value of the parameter values of these two pixels. It should be noted that the noise removal method described herein is merely an example but may be realized using any method.

As a result of step S20, pixels not included in the homogeneous region form an edge.

At step S30 (third step), for each parameter, a conversion of the parameter is carried out on each of the homogeneous regions specified at step S20 according to the details of a predetermined image conversion.

FIG. 10A and FIG. 10B conceptually illustrate a process carried out when the image conversion is image upsizing. As shown in FIG. 10A and FIG. 10B, in the case of performing image upsizing, the density of a parameter is increased in a homogeneous region. FIG. 10A shows the distribution of a parameter before the conversion where a homogeneous region AE1 with average parameter value P1 and a homogeneous region AE2 with average parameter value P2 adjoin each other. The difference in brightness between pixels S1 and S2 residing at the boundary between the homogeneous regions AE1 and AE2 forms an edge. Now, to upsize the image including the distribution of FIG. 10A by a factor of 2, for example, pixels indicated by white circles are inserted between pixels indicated by black circles as shown in FIG. 10B. The parameter value of each of the white circle pixels is, for example, equal to the parameter value of a black circle pixel neighboring the white circle pixel. Further, a new pixel S3 is generated between the pixels S1 and S2 such that the pixel S3 has a parameter value equal to that of the pixel S1 or S2. In the example of FIG. 10B, the parameter value of the pixel S1 is copied to the pixel S3, so that the difference in brightness between the pixels S2 and S3 is equal to the difference in brightness between the pixels S1 and S2 in FIG. 10A. As a result, the edge is maintained.

The portions other than the homogeneous region all may be treated as edges. For example, a portion between the homogeneous regions AC1 and AC2 of FIG. 2E includes 10 segments between pixels, and each one of these segments is regarded as an edge. The method for increasing the density may be copying the parameter value of a neighboring pixel as illustrated for the pixel S3 of FIG. 10B. For example, the parameter value may be copied from a pixel on the left or right side of the position at which the density is to be increased. Alternatively, the parameter value may be copied from a pixel on the left side and a pixel on the right side alternately at every other segment.

FIG. 11A and FIG. 11B conceptually illustrate a process carried out when the image conversion is image downsizing. As shown in FIG. 1A and FIG. 11B, in the case of performing image downsizing, the density of a parameter is decreased in a homogeneous region. Although the method for decreasing the density is arbitrary, in the example of FIG. 11A and FIG. 11B the average value of the parameter values of neighboring pixels is used. FIG. 11A shows the distribution of a parameter before the conversion where a homogeneous region AF1 with average parameter value P1 and a homogeneous region AF2 with average parameter value P2 adjoin each other. The difference in brightness between pixels S6 and S7 residing at the boundary between the homogeneous regions AF1 and AF2 forms an edge. Now, the image including the distribution of FIG. 11A is downsized to a ½, for example, so that the distribution is generated as shown in FIG. 11B. In the homogeneous region AF1, the average value of the parameter values in a pixel group SG1 is employed as the parameter value of a pixel S4, and the average value of the parameter values in a pixel group SG2 is employed as the parameter value of a pixel S5, whereby the decrease of the intensity is realized. In this process, the pixel group SG1 and the pixel group SG2 partially overlap each other, whereby a smooth variation in the parameter value of the downsized image is achieved. The difference in brightness between the pixels S6 and S7 which forms an edge in FIG. 11A is maintained in FIG. 11B as the difference in brightness between the pixels S7 and S8. That is, the parameter value of the pixel S8 is copied from the pixel S6.

At step S40 (fourth step), the brightness of each pixel of a second image obtained after the predetermined image conversion is obtained using the respective parameters obtained after the conversion process of step S30. At this step, reflected light intensity $I_v$ may be calculated for each pixel by assigning the parameters to the illumination equation of formula (1).

As described above, according to embodiment 1, the brightness is divided into illumination equation parameters and, for each parameter, the correlation between pixels is utilized to carry out an image conversion, such as image upsizing, image downsizing, or the like. Since the image conversion is carried out on each parameter in each homogeneous region, an edge portion is maintained as a boundary condition between the homogeneous regions. A homogeneous region is specified based on the similarity in illumination equation parameters which are the physical characteristics of a photograph subject. That is, a homogeneous region is determined with physical supports. Thus, an image conversion of stable image quality can be realized with the edge sharpness and texture being maintained.

It should be noted that an image conversion device which includes a parameter acquiring section for performing step S10, a homogeneous region specifying section for performing step S20, a parameter converter for performing step S30, and a brightness calculating section for performing step S40 may be constructed.

<Other Examples of Illumination Equations>

The illumination equations used in the present invention are not limited to those described above in embodiment 1. For example, the following equations may be employed instead.

$$I_v = I_{v,a} + I_i(\overline{N} \cdot \overline{L})d\omega \cdot k_d \rho_d \quad \text{Formula (5)}$$

$$I_v = I_{v,a} + I_i(\overline{N} \cdot \overline{L})d\omega \cdot \rho \quad \text{Formula (6)}$$

$$I_v = I_{v,a} + I_{v,i}d\omega \quad \text{Formula (7)}$$

Formula (5) is directed to a diffuse reflection object and has 6 parameters, where $I_{v,a}$ is the light intensity in a sight line direction from the surroundings. In formula (6), the diffuse reflection and the mirror reflection are not separated. Formula (6) has 5 parameters. In formula (7), the reflectance is not considered. Formula (7) has 2 parameters, where $I_{v,i}$ is the light intensity in a sight line direction from a target pixel.

Embodiment 2

In embodiment 2 of the present invention, the predetermined image conversion is image compression. The basic process flow is the same as that of embodiment 1 except that at step S30 respective parameters are compressively encoded for image compression. In this case, normally, step S40 is not performed, while compressed image data is transferred and/or recorded. In the case of reproducing an image, the respective parameters are decoded separately, and the brightness of each pixel is calculated. An image conversion method according to embodiment 2 can be realized by executing a program for carrying out the method on a computer as in embodiment 1. Further, an image compression device which includes a parameter acquiring section for performing step S10, a homogeneous region specifying section for performing step S20, and a parameter compression section for performing step S30 may be constructed.

Figure 12:
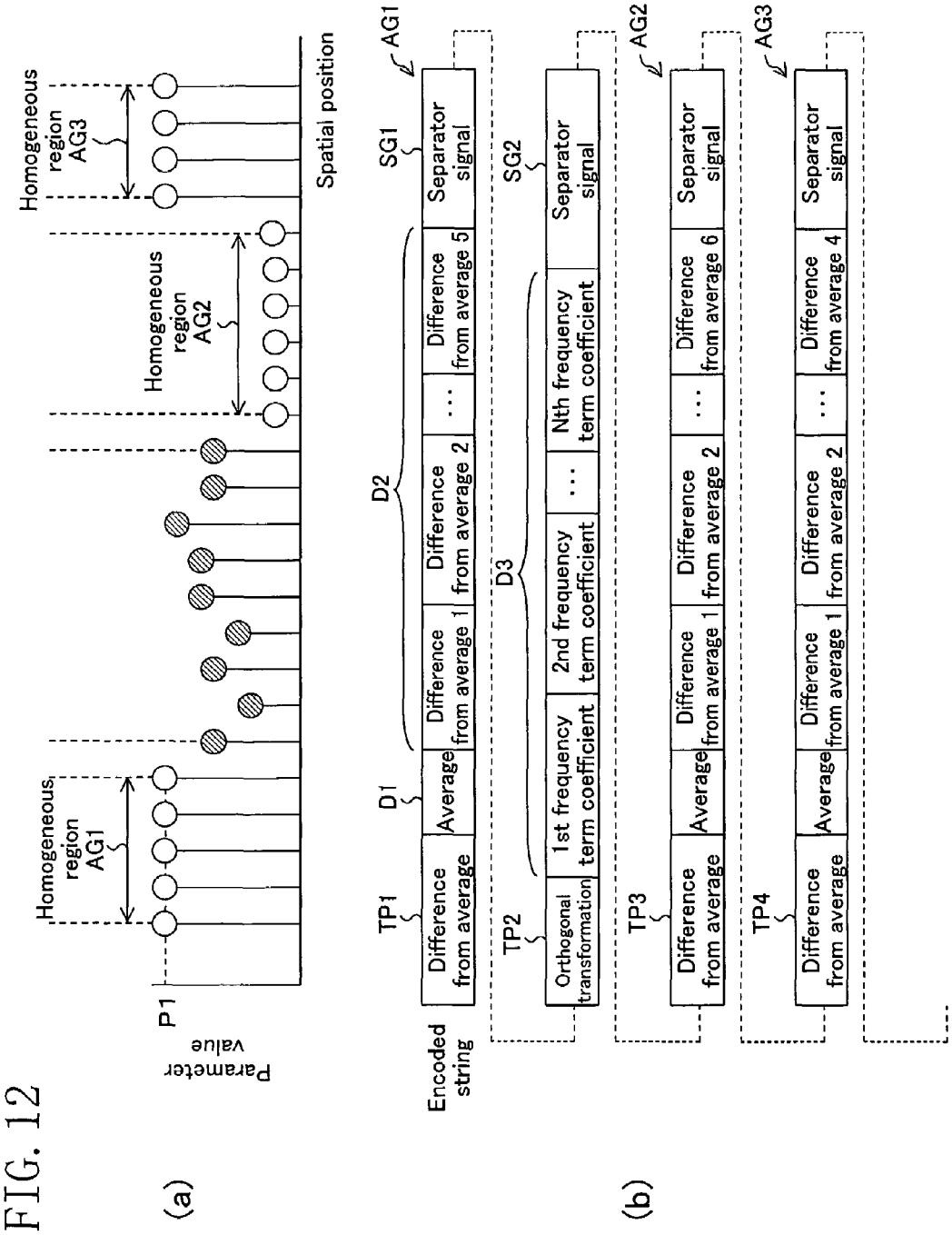
FIG. 12A and FIG. 12B conceptually illustrate a parameter conversion process for image compression according to embodiment 2 of the present invention.

FIG. 12A and FIG. 12B conceptually illustrate a parameter conversion process according to embodiment 2. In FIG. 12A, white circles indicate the parameter values of pixels included in homogeneous regions AG1 to AG3, while hatched circles indicate the parameter values of pixels not included in the homogeneous regions. As shown in FIG. 12A, the parameter values are substantially uniform in each of the homogeneous regions AG1 to AG3. Therefore, the amount of information regarding the parameter values are almost converged at the average value. Thus, in each of the homogeneous regions AG1 to AG3, the average value of the parameter values and the difference between the parameter value of each pixel and the average value are encoded, and a small amount of codes are allocated to the difference. With this arrangement, compressive encoding of the parameter values can be realized with a small amount of codes without deteriorating the image quality.

For example, as shown in an encoded string of FIG. 12B, as for the homogeneous region AG1, the encoding type TP1 is first declared (herein, "difference from average value"). Then, the average value D1 and the differences from the average value in respective pixels (D2) follow, and a separator signal SG1 are added at the end. It should be noted that, instead of adding the separator signal SG1, a special code may be allocated as an encode type for recognizing separation. When the difference D2 is negligibly small, a run length encoding may be employed.

Among the pixels not included in a homogeneous region, the parameter value varies irregularly. Therefore, compression of the data amount cannot be expected even if encoding is carried out based on the difference from the average value. In view of such, orthogonal transformation which is employed in, for example, JPEG (Joint Photographic Experts Group) and MPEG (Moving Picture Experts Group) may be used. Specifically, "orthogonal transformation" is declared as the encoding type TP2, and the frequency coefficients D3 are encoded sequentially from the first frequency term. In the case where a homogeneous region occupies almost all the extent of an image, the parameter value of a pixel not included in the homogeneous region itself may be encoded.

After a separator signal SG2, as for the homogeneous regions AG2 and AG3, "difference from average value" is declared as the encoding types TP3 and TP4, respectively, as is in the homogeneous region AG1.

As described above, according to embodiment 2, the brightness value is divided into constituent parameters, and correlations with neighboring pixels are obtained. Therefore, higher correlations can be expected as compared with the brightness value. Thus, the compression efficiency can be improved. Since compressive encoding is carried out on each homogeneous region, a high compression rate can be realized as compared with the brightness-based method while the sharpness and texture are maintained.

Embodiment 3

In embodiment 3 of the present invention, the above-described image conversion method is applied to texture mapping in computer graphics.

Figure 13:
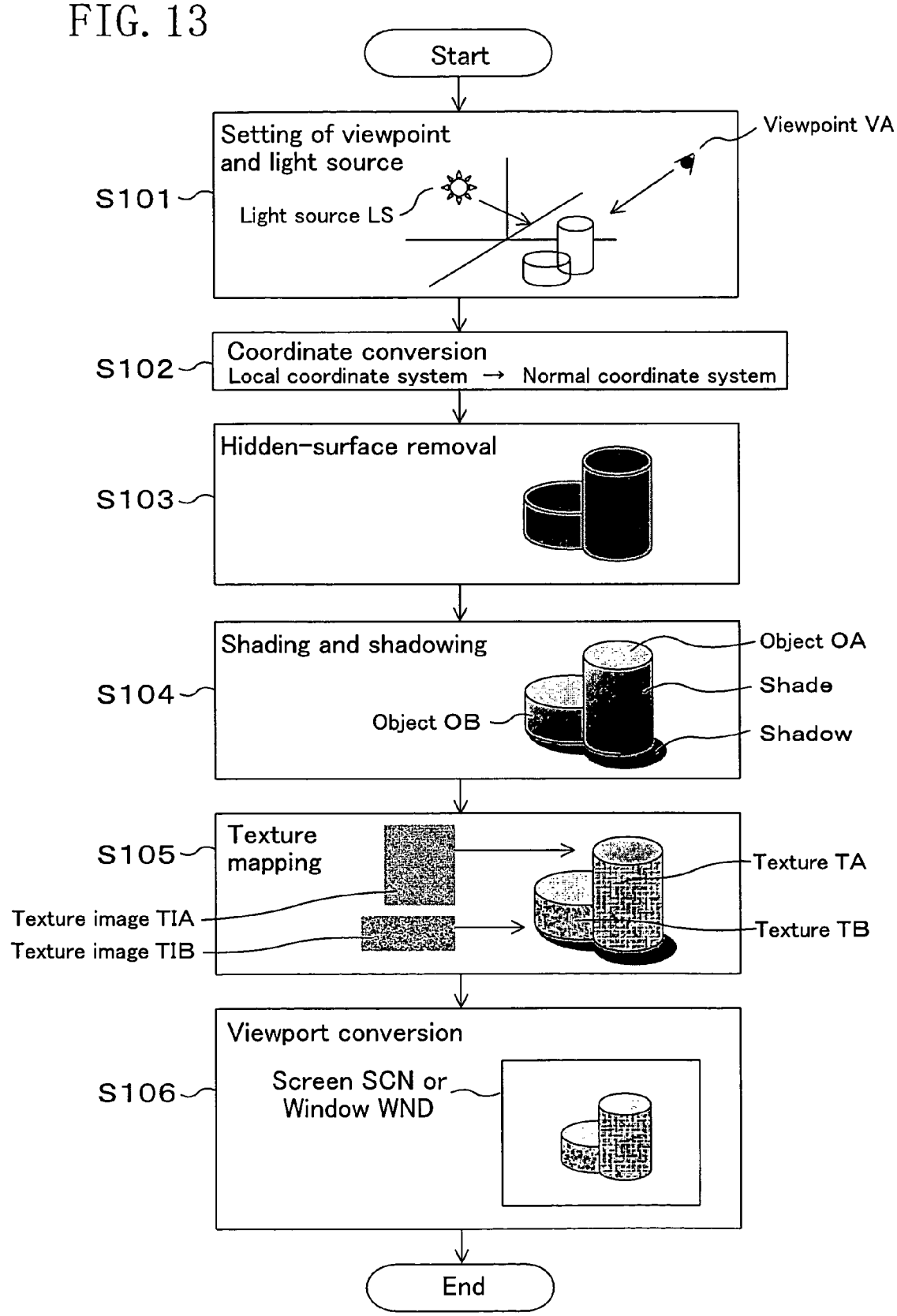
FIG. 13 illustrates a flow of a rendering process according to embodiment 3 of the present invention.

FIG. 13 is a flowchart which illustrates a primary flow of a rendering process. The rendering process herein means, in computer graphics, the process of converting a 3-dimensional model created in a computer to 2-dimensional image data (see, for example, non-patent document 1, p. 79). As shown in FIG. 13, the rendering process includes, as the main steps, setting of a viewpoint and a light source (S101), coordinate conversion (S102), hidden-surface removal (S103), shading and shadowing (S104), texture mapping (S105), and viewport conversion (S106).

First, at step S101, a viewpoint VA and a light source LS are set so that the appearance of objects is determined. Then, at step S102, objects managed in respective local coordinate systems are transplanted into a normal coordinate system. At step S103, surfaces which are hidden from the viewpoint VA are deleted. At step S104, the incidence of light from the light source LS onto objects OA and OB is calculated, and Shade and Shadow are generated.

At step S105, texture mapping is performed to generate textures TA and TB for the objects OA and OB. In general, a texture is acquired together with image data. A texture image TIA is deformed according to the shape of the object OA and synthesized on the object OA. Likewise, a texture image TIB is deformed according to the shape of the object OB and synthesized on the object OB.

In embodiment 3, the above-described image conversion is applied to this texture mapping. Specifically, first, preprocessing is carried out wherein the texture images TIA and TIB are placed on the objects OA and OB of 3-dimensional model, respectively. Then, the process is carried out according to the flow of FIG. 1. At step S10, parameters are acquired for every pixel of the 2-dimensional texture images TIA and TIB placed on the objects OA and OB using the optical parameters of the texture images TIA and TIB and the surface normal vectors of the objects OA and OB. The subsequent steps are the same as those of embodiment 1. A texture mapping method according to embodiment 3 can be realized by executing a program for carrying out the method, which is stored in a computer-readable medium, on a computer. Further, a texture mapping device which includes a preprocessing section for performing the above-described preprocessing, a parameter acquiring section for performing step S10, a homogeneous region specifying section for performing step S20, a parameter converter for performing step S30, and a brightness calculating section for performing step S40 may be constructed.

Lastly, at step S106, the viewport conversion is performed to generate a 2-dimensional image which has an image size adjusted to a displayed screen SCN or window WND.

Herein, the rendering process needs to be performed because the viewpoint and the position of the light source are changed. In an interactive system, such as a game machine, the rendering process is frequently repeated. In texture mapping, generally, texture data which is to be placed on a surface of an object is prepared in the form of an image. Thus, if the viewpoint or light source is changed, the texture data needs to be transformed by upsizing, downsizing, rotation, color change, or the like, at every such occasion.

Thus, by performing image conversion for every parameter as in embodiment 3, texture mapping adapted to various viewpoints and light source settings can be realized while the texture is maintained. Especially when the position of the light source is changed, it is difficult to calculate a change in texture based on the brightness value. Thus, the method of embodiment 3 which enables directly controlling a light source vector is advantageous as to the principle as compared with the conventional techniques.

Hereinafter, structure examples for implementing the present invention will be described.

First Structure Example

Figure 14:
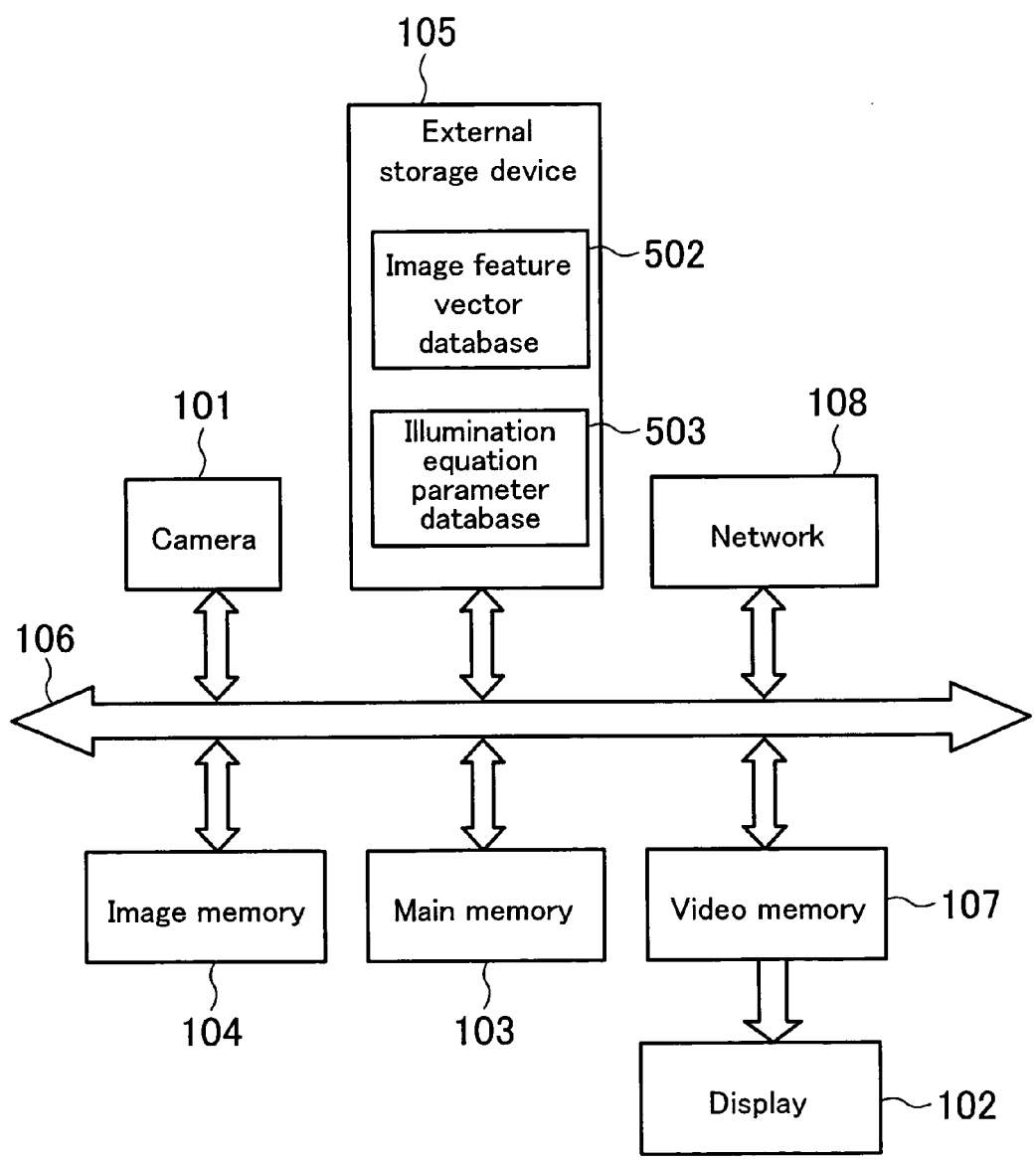
FIG. 14 illustrates the first structure example for implementing the present invention which uses a personal computer.

FIG. 14 illustrates the first structure example wherein the image conversion according to the present invention is carried out using a personal computer. Herein, the resolution of a camera 101 is lower than that of a display 102. To make full use of the display capacity of the display 102, an upsized image is generated using an image conversion program loaded into a main memory 103. A low-resolution image captured by the camera 101 is recorded in an image memory 104. An image feature vector database 502 and illumination equation parameter database 503 as illustrated in FIG. 6 are prepared in advance in an external storage device 105. These databases 502 and 503 can be referred to by the image conversion program of the main memory 103.

The process of the image conversion program is the same as that of embodiment 1. Homogeneous regions are determined for each illumination equation parameter, and the parameter density is increased in the homogeneous regions. Specifically, the low-resolution image is read from the image memory 104 through a memory bus 106 and upsized so as to comply with the resolution of the display 102. The thus-upsized image is transferred to a video memory 107 through the memory bus 106. The upsized image transferred to the video memory 107 is displayed on the display 102.

The present invention is not limited to the structure of FIG. 14 but may have any of various structures. For example, the illumination equation parameters may be measured directly from a photograph subject using a measurement device. In this case, the image feature vector database 502 and the illumination equation parameter database 503 of the external storage device 105 are not necessary. Further, a low-resolution image may be acquired through a network 108. The texture mapping described in embodiment 3 may be performed in the main memory 103 while texture data is stored in the external storage device 105.

When the resolution of the camera 101 is higher than that of the display 102, the image conversion program loaded into the main memory 103 may execute image downsizing as described in embodiment 1. Alternatively, image compression may be carried out according to embodiment 2. In this case, the illumination equation parameters may be compressed and transmitted through the network 108, or the like.

The camera 101 may be any type of image capturing device, such as a camera mobile phone, digital still camera, video movie camera, or the like. Furthermore, the present invention can be implemented in a reproduction device for reproducing a movie which has been recorded in advance.

Second Structure Example

Figure 15:
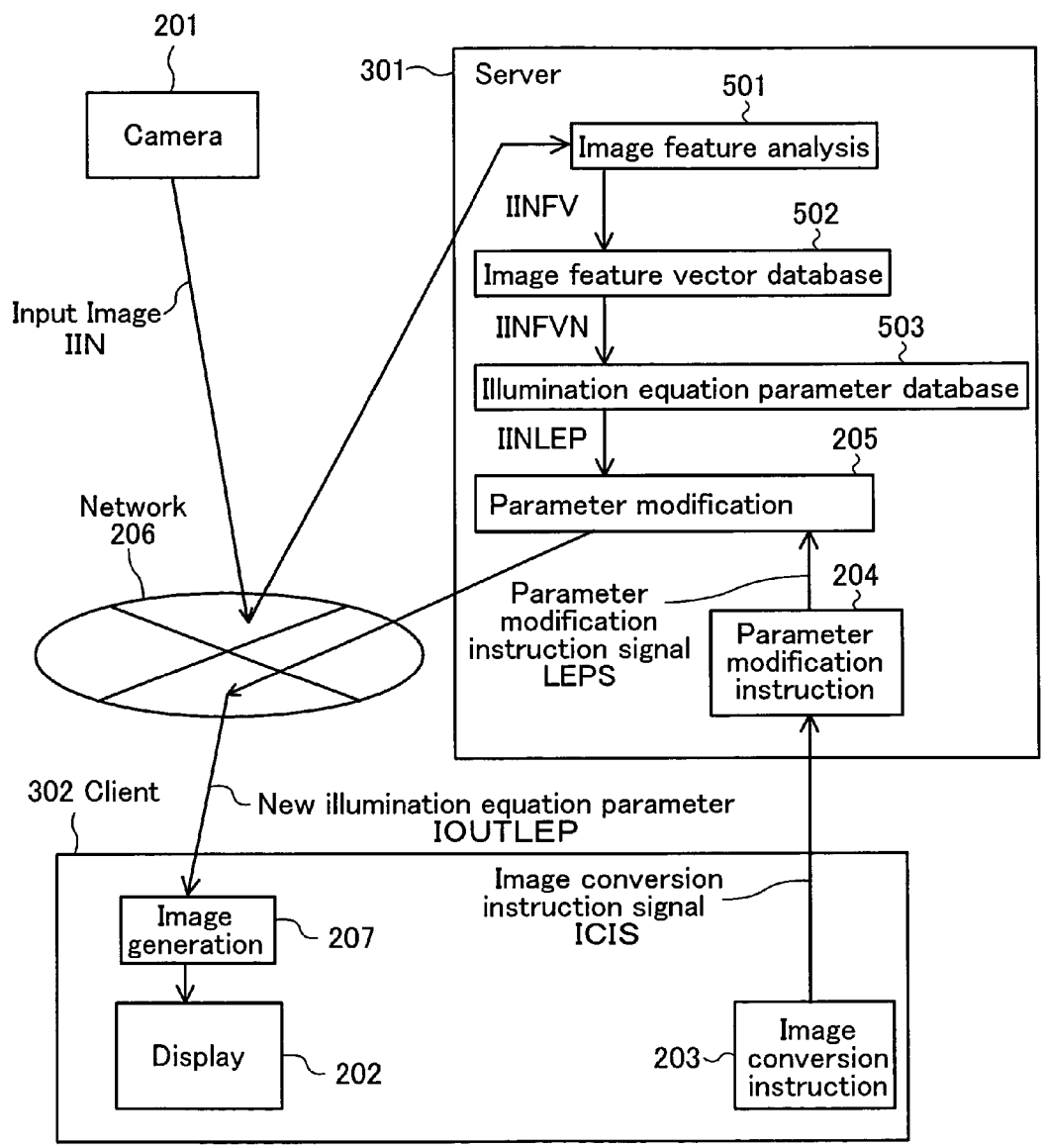
FIG. 15 illustrates the second structure example for implementing the present invention which uses a server-client system.

FIG. 15 illustrates the second structure example wherein the image conversion according to the present invention is carried out using a server-client system. Herein, the resolution of a camera 201 is lower than that of a display 202. To make full use of the display capacity of the display 102, image upsizing is carried out in the server-client system. A server 301 includes an image feature analysis section 501, an image feature vector database 502, and an illumination equation parameter database 503 as in FIG. 6. Input image illumination equation parameter IINLEP is calculated from input image IIN and output to a parameter modification section 205. This operation corresponds to step S10 in the flow of FIG. 1. The image feature analysis section 501, the image feature vector database 502, and the illumination equation parameter database 503 constitute a parameter acquiring section.

In the meanwhile, an image conversion instruction is transmitted as image conversion instruction signal ICIS from an image conversion instruction section 203 of a client 302 to a parameter modification instruction section 204 of the server 301. The parameter modification instruction section 204 converts the details of the image conversion which are carried by image conversion instruction signal ICIS to the details of parameter modification, which are then output as parameter modification instruction signal LEPS to the parameter modification section 205. The parameter modification section 205 modifies input image illumination equation parameter IINLEP according to the image conversion method described in embodiment 1 to perform image upsizing or image compression, thereby generating new parameter value IOUTLEP. This operation corresponds to steps S20 and S30 in the flow of FIG. 1. The parameter modification section 205 corresponds to the homogeneous region specifying section and parameter converter.

Through the above operation, the server 301 provides new parameter value IOUTLEP, which is generated according to the image conversion instruction from the client 302, to the client 302 through a network 206. In the client 302 which has received new parameter value IOUTLEP, an image generation section 207 (brightness calculating section) generates an upsized image and supplies the upsized image to the display 202. This operation corresponds to step S40 in the flow of FIG. 1.

The present invention is not limited to the structure of FIG. 15. When the resolution of the camera 201 is higher than that of the display 202, the parameter modification section 205 may perform image downsizing as described in embodiment 1. If the parameter modification section 205 operates as an encoder according to embodiment 2 and the image generation section 207 operates as a decoder, compressed data can be distributed through the network 206.

It should be noted that the combination of image-related devices and the positions of the respective sections on the system (for example, does it belongs to the server 301 or client 302, or anything else?) are arbitrary. The camera 201 may be any type of image capturing device, such as a camera mobile phone, digital still camera, video movie camera, or the like. Furthermore, the present invention can be implemented in a reproduction device for reproducing a movie which has been recorded in advance.

Third Structure Example

Figure 16:
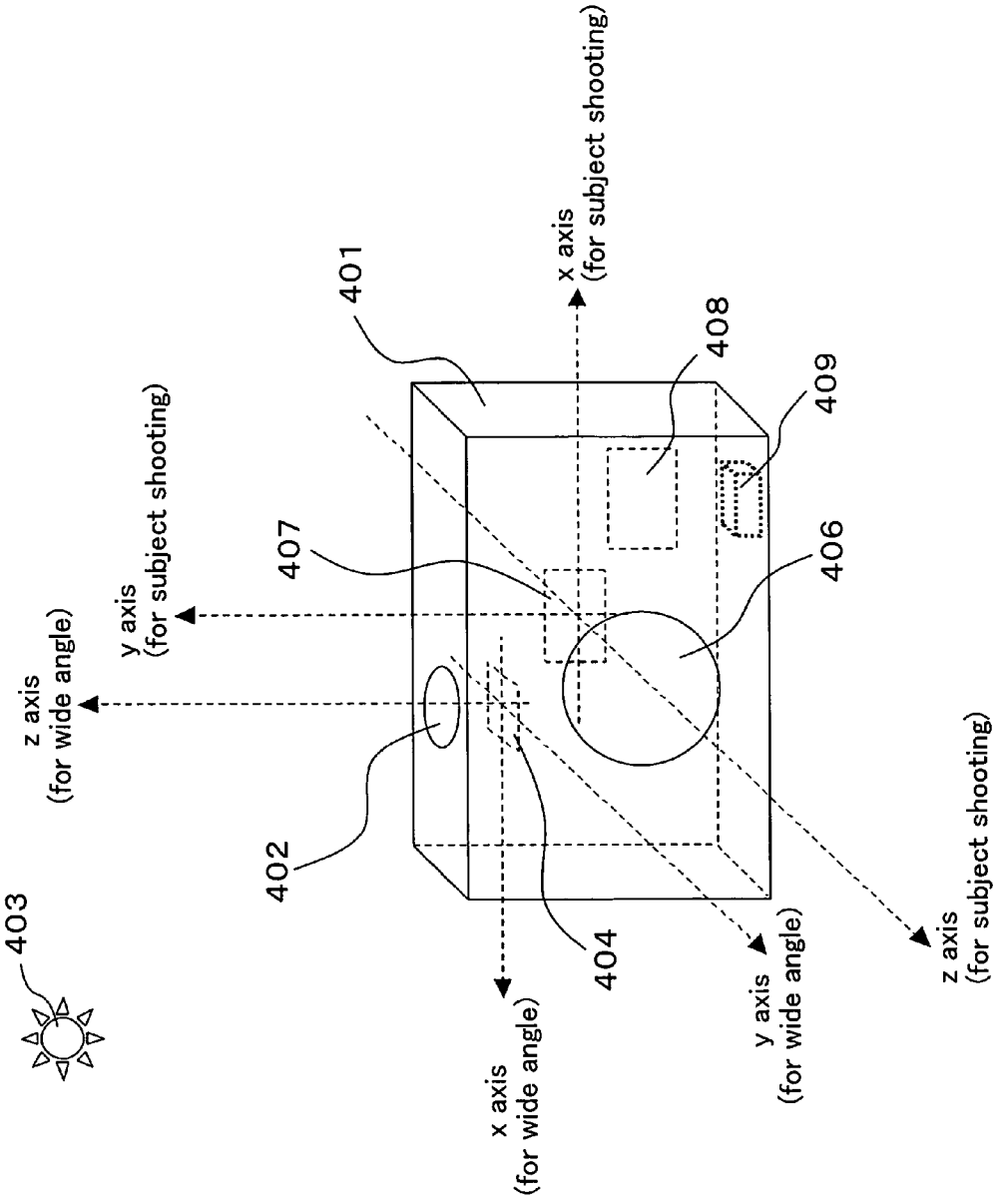
FIG. 16 illustrates the third structure example for implementing the present invention wherein an image conversion of the present invention is carried out in image capturing with a camera.

FIG. 16 illustrates the third structure example wherein the image conversion according to the present invention is carried out at the time of photo shooting with a camera.

A camera 401 includes a wide angle lens 402 and is capable of capturing a wide-field image having a view angle of, for example, 180°, at one time. The wide angle lens 402 is attached to face upward so that an image of a light source 403 can be captured. An xyz 3-dimensional coordinate system where the optical axis of the wide angle lens 402 is z axis, the horizontal direction of a wide-angle imaging device 404 included inside the camera 401 is x axis, and the vertical direction of the wide-angle imaging device 404 is y axis is given such that the focal position of the wide angle lens 402 is the origin of the coordinate system, and light source vector L is determined.

FIG. 17A shows the relationship between the position of the light source 403 and a wide-field image 405 captured through the wide angle lens 402. Herein, it is assumed that the position of the light source 403 moves along curve LT. The light source 403 moving from position PS1 to position PS5 on curve LT is recorded on line ST of the wide-field image 405 from position PX1 to position PX5. Now, a method for obtaining light source vector L2 is described wherein, when the light source 403 exists at position PS2, the angle formed by line ST and the x axis is θ, and the angle formed by line ST and light source vector L2 is φ.

FIG. 17B is another view of the wide-field image 405 of FIG. 17A which is seen in the z-axis direction where the distance between position PX1 and origin O of the coordinate system is d, and the distance between position PX2 and origin O of the coordinate system is r. Herein, position PX1 has φ=0, origin O of the coordinate system has φ=90°, and the light source positions and the positions on the wide-field image are linearly distributed. Therefore, angle φ of position PX2 is expressed as follows:

$$\phi = \frac{r\pi}{2d} \quad \text{Formula (10)}$$

Where position PX1 and position PX2 on the wide-field image and the pixel positions of origin O of the coordinate system are $(x_{L1}, y_{L1})$, $(x_{L2}, y_{L2})$, and $(x_O, y_O)$, respectively, distance d between position PX1 and origin O is:

$$d = \sqrt{(x_{L1}-x_O)^2 + (y_{L1}-y_O)^2} \quad \text{Formula (11)}$$

distance r between position PX2 and origin O is:

$$r = \sqrt{(x_{L2}-x_O)^2 + (y_{L2}-y_O)^2} \quad \text{Formula (12)}$$

FIG. 17C shows a triangle formed by drawing line LT from position PX2 toward light source vector L2 in the z-axis direction. Herein, the length of line LT, $z_{L2}$, is:

$$z_{L2} = r \tan\left(\frac{r\pi}{2d}\right) \quad \text{Formula (13)}$$

The length of light source vector L2 is defined by a unit vector having a length of 1 as follows:

$$\left[\frac{x_{L2}}{\sqrt{r^2+z_{L2}^2}} \quad \frac{y_{L2}}{\sqrt{r^2+z_{L2}^2}} \quad \frac{z_{L2}}{\sqrt{r^2+z_{L2}^2}}\right] = \quad \text{Formula (14)}$$

-continued $$\left[\frac{x_{L2}}{r\sqrt{1+\tan^2\left(\frac{r\pi}{2d}\right)}} \quad \frac{y_{L2}}{r\sqrt{1+\tan^2\left(\frac{r\pi}{2d}\right)}} \quad \frac{z_{L2}}{r\sqrt{1+\tan^2\left(\frac{r\pi}{2d}\right)}}\right]$$

Photo shooting of a photograph subject is carried out with a subject shooting lens 406 and a subject imaging device 407. An image converter 408 converts a first image, which is the output of the subject imaging device 407, to a second image. The image converter 408 performs, for example, the image upsizing according to the flowchart of FIG. 1, the image compression according to FIG. 12, or the like. Although the coordinate system used for image conversion is not limited, the xyz 3-dimensional coordinate system of the subject imaging device 407 is preferably used because the image conversion is performed on the output of the subject imaging device 407. Thus, the light source vector expressed in the xyz 3-dimensional coordinate system of the wide-angle imaging device 404, which is expressed by formula (14), is converted to the xyz 3-dimensional coordinate system of the subject imaging device 407. The conversion of the coordinate system is realized by conversion of the coordinate axes. It is assumed that the x axis of the xyz 3-dimensional coordinate system of the wide-angle imaging device 404 corresponds to vector $(x_{light,x}, y_{light,x}, z_{light,x})_{object}$ in the xyz 3-dimensional coordinate system of the subject imaging device 407. The x axis of the xyz 3-dimensional coordinate system of the wide-angle imaging device 404 corresponds to vector $(x_{light,x}, y_{light,x}, z_{light,x})_{light}$ in the xyz 3-dimensional coordinate system of the wide-angle imaging device 404. Vectors for the y and z axes are defined as is for the x axis, so that the vectors of the axes have the following relationship of 3×3 matrix M:

$$\begin{pmatrix} x_{light,x} & x_{light,y} & x_{light,z} \\ y_{light,x} & y_{light,y} & y_{light,z} \\ z_{light,x} & z_{light,y} & z_{light,z} \end{pmatrix}_{object} = \quad \text{Formula (15)}$$

$$M \begin{pmatrix} x_{light,x} & x_{light,y} & x_{light,z} \\ y_{light,x} & y_{light,y} & y_{light,z} \\ z_{light,x} & z_{light,y} & z_{light,z} \end{pmatrix}_{light}$$

Formula (15) is modified into formula (16) as for matrix M:

$$M = \begin{pmatrix} x_{light,x} & x_{light,y} & x_{light,z} \\ y_{light,x} & y_{light,y} & y_{light,z} \\ z_{light,x} & z_{light,y} & z_{light,z} \end{pmatrix}_{object} \quad \text{Formula (16)}$$

$$\begin{pmatrix} x_{light,x} & x_{light,y} & x_{light,z} \\ y_{light,x} & y_{light,y} & y_{light,z} \\ z_{light,x} & z_{light,y} & z_{light,z} \end{pmatrix}_{light}^{-1}$$

By subjecting formula (14) to matrix M, light source vector L is converted from the xyz 3-dimensional coordinate system of the wide-angle imaging device 404 to the xyz 3-dimensional coordinate system of the subject imaging device 407.

Since the light source exists above the camera 401 in many cases, an image of the light source 403 can be captured by using the wide angle lens 402 having a view angle of 180°, for example. If the view angle is insufficient so that the view angle of the wide angle lens 402 cannot cover the light source 403, the direction of the camera 401 is changed such that the light source 403 is within the view angle of the wide angle lens 402. Thus, it is necessary to measure the change in direction of the camera 401. For example, the camera 401 may include a 3-dimensional posture sensor 409 (formed by an acceleration sensor, or the like). 3-dimensional movements of the xyz 3-dimensional coordinate axes of the wide-angle imaging device 404 are acquired from the 3-dimensional posture sensor 409, and the coordinate conversion is carried out in the same way as that for formula (16).

Another advantageous means for changing the direction of a camera is the structure of a foldable mobile phone. Referring to FIG. 18A, FIG. 18B and FIG. 18C, a mobile phone 601 has an object-shooting camera 602 (a camera for capturing an image of a photograph subject in front of a user of the mobile phone 601) and a self-shooting camera 603 (a camera for capturing an image of the user of the mobile phone 601). The object-shooting camera 602 changes its direction when a folded display portion 604 is opened. Specifically, as shown in FIG. 18A, when opening angle DAG of the display portion 604 is small, the object-shooting camera 602 faces upward. As shown in FIG. 18C, when opening angle DAG of the display portion 604 is large, the object-shooting camera 602 faces frontward of the user of the mobile phone 601. As shown in FIG. 18B, when opening angle DAG of the display portion 604 is medium, the object-shooting camera 602 faces in an intermediate direction between the upward area of the mobile phone 601 and the front area of the user of the mobile phone 601. Opening angle DAG of the display portion 604 is detected by an angle sensor 606 provided at a hinge 605, and the direction of the object-shooting camera 602 is calculated from the detected angle DAG. The xyz 3-dimensional coordinate system is established, for example, with the focal position of the self-shooting camera 603 being on the origin of the system. Images captured by the two cameras can be managed in the same xyz 3-dimensional coordinate system according to formula (16) based on the relationship with the focal position of the object-shooting camera 602 which is defined by the structure of the mobile phone 601. It should be noted that, as a matter of course, the self-shooting camera 603 can be used for capturing an image of the light source. Thus, among the illumination equation parameters shown in FIG. 3, light source vector L can be calculated with the above structure.

The camera 401 have a polarization filter to separate reflected light entering the subject shooting lens 406 into the diffuse reflection component and the mirror reflection component according to, for example, the method described with formula (4) and FIG. 5. Surface normal vector N can be calculated using the diffuse reflection component by the photometric stereo method described with formula (9). The photometric stereo method requires three or more images of different light source directions as described with formula (8). If the light source 403 is movable, the shooting is carried out with three or more different positions of the light source 403 for obtaining formula (8). As a photograph subject moves, the positional relationship between the light source and the photograph subject changes, and as a result, the direction of the light source changes. Thus, formula (8) is obtained by performing shooting three times or more while specific points of the photograph subject are tracked. On the other hand, the mirror reflection component corresponds to $k_s \rho_s$ of formula (1). If light source vector L and surface normal vector N become known, the unknown parameters included in formula (2) are mirror reflection component ratio $k_s$, Fresnel coefficient $F_\lambda$, microfacet distribution m, and refractive index n. These parameters can be determined, for example, by fitting based on a least square method from a plurality of sample data pieces or by using a measurement device, such as a refractometer, or the like.

It is clearly appreciated that surface normal vector N can be measured by separately using a range finder in addition to the components of FIG. 16.

As described above, the present invention can be implemented in widespread personal computers, server-client systems, camera mobile phones, digital still cameras, and general video devices, such as video movie cameras, television sets, etc., and does not require any special device, operation, or management. It should be noted that the present invention does not put any limitation on the connection of devices or the internal structures of devices, such as installation in special-purpose hardware, combination of software and hardware, etc.

According to the present invention, image conversion can be realized with stable image quality while the sharpness of edges and texture are maintained. For example, the present invention can be used in the fields of visual entertainment wherein scenes in sight on the occasions of sport activity, tourism, commemorative photo shooting, etc., are recorded in the form of pictures. Further, in the fields of culture and arts, the present invention can be used for providing a highly-flexible digital archive system which is not limited by a photograph subject or photo shooting location.

What is claimed is:

1. An image conversion method for performing image upsizing or image downsizing on a first image to convert the first image into a second image, comprising:
 a first step of acquiring, for each pixel of the first image, values of a plurality of parameters of a predetermined illumination equation, wherein the predetermined illumination equation defines a brightness as a function of the plurality of parameters and a display value of the pixel, wherein the plurality of parameters are determined by optical characteristics associated with a photograph subject and different from the display value of the pixel;
 a second step of specifying, for each of the parameters, a homogeneous region including pixels which are similar in value of the parameter;
 a third step of increasing or decreasing density of each of the parameters, in each of the homogeneous region specified at the second step, according to details of the image upsizing or image downsizing; and
 a fourth step of determining the brightness of each pixel of the second image using the values of the parameters obtained after the density increasing or decreasing of the third step.

2. The image conversion method of claim 1, wherein the first step of acquiring the plurality of parameters includes measuring the parameters from a photograph subject or estimating the parameters from the first image.

3. The image conversion method of claim 1, wherein the second step includes evaluating a similarity among the plurality of pixels using a variance in the value of the parameter among the pixels.

4. The image conversion method of claim 1, wherein the second step includes removing noise from the specified homogeneous region.

5. A device for performing image upsizing or image downsizing on a first image to convert the first image into a second image, comprising:
 a parameter acquiring section for acquiring, for each pixel of the first image, values of a plurality of parameters of a predetermined illumination equation, wherein the predetermined illumination equation defines a brightness as a function of the plurality of parameters and a display value of the pixel, wherein the plurality of parameters are determined by optical characteristics associated with a photograph subject and different from the display value of the pixel;

a homogeneous region specifying section for specifying, for each of the parameters, a homogeneous region including pixels which are similar in value of the parameter;

a parameter converter for increasing or decreasing density of each of the parameters, in each of the homogeneous region specified by the homogeneous region specifying section, according to details of the image upsizing or image downsizing; and a brightness calculating section for calculating the brightness of each pixel of the second image using the values of the parameters obtained after the density increasing or decreasing of the parameter converter.

6. A server-client system for performing an image conversion, comprising:
a server which includes the parameter acquiring section, the homogeneous region specifying section, and the parameter converter of claim 5; and
a client which includes the brightness calculating section of claim 5,
wherein the client instructs the server of details of the image upsizing or image downsizing.

7. A computer program embodied in a computer readable medium which instructs a computer to perform a method for performing image upsizing or image downsizing on a first image to convert the first image into a second image, the method comprising:
a first step of acquiring, for each pixel of the first image, values of a plurality of parameters of a predetermined illumination equation, wherein the predetermined illumination equation defines a brightness as a function of the plurality of parameters and a display value of the pixel, wherein the parameters are determined by optical characteristics associated with a photograph subject and different from the display value of the pixel;
a second step of specifying, for each of the parameters, a homogeneous region including pixels which are similar in value of the parameter;
a third step of increasing or decreasing density of each of the parameters, in each of the homogeneous region specified at the second step, according to details of the image upsizing or image downsizing; and
a fourth step of determining the brightness of each pixel of the second image using the values of the parameters obtained after the density increasing or decreasing of the third step.

8. A texture mapping method, comprising:
a preprocessing of placing a texture image on a 3-dimensional CG model object;
a first step of acquiring, for each pixel of the texture image placed on the object, values of a plurality of parameters of a predetermined illumination equation, wherein the predetermined illumination equation defines a brightness as a function of the plurality of parameters and a display value of the pixel, wherein the plurality of parameters are determined by optical characteristics associated with a photograph subject and different from the display value of the pixel;
a second step of specifying, for each of the parameters, a homogeneous region including pixels which are similar in value of the parameter;
a third step of increasing or decreasing density of each of the parameters, in each of the homogeneous region specified at the second step, according to details of the image upsizing or image downsizing; and
a fourth step of determining the brightness of each pixel in an image of the object using the values of the parameters obtained after the density increasing or decreasing of the third step.

9. A texture mapping device, comprising:
a preprocessing section for placing a texture image on a 3-dimensional CG model object;
a parameter acquiring section for acquiring, for each pixel of the texture image placed on the object, values of a plurality of parameters of a predetermined illumination equation, wherein the predetermined illumination equation defines a brightness as a function of the plurality of parameters and a display value of the pixel, wherein the plurality of parameters are determined by optical characteristics associated with a photograph subject and different from the display value of the pixel;
a homogeneous region specifying section for specifying, for each of the parameters, a homogeneous region including pixels which are similar in value of the parameter;
a parameter converter for increasing or decreasing density of each of the parameters, in each of the homogeneous region specified by the homogeneous region specifying section, according to details of the image upsizing or image downsizing; and
a brightness calculating section for calculating the brightness of each pixel in an image of the object using the values of the parameters obtained after the density increasing or decreasing of the parameter converter.

10. A computer program embodied in a computer readable medium which instructs a computer to perform a texture mapping method, the method comprising:
a preprocessing of placing a texture image on a 3-dimensional CG model object;
a first step of acquiring, for each pixel of the texture image placed on the object, values of a plurality of parameters of predetermined illumination equation, wherein the predetermined illumination equation defines a brightness as a function of the plurality of parameters and a display value of the pixel, wherein the plurality of parameters are determined by optical characteristics associated with a photograph subject and different from the display value of the pixel;
a second step of specifying, for each of the parameters, a homogeneous region including pixels which are similar in value of the parameter;
a third step of increasing or decreasing density of each of the parameters, in each of the homogeneous region specified at the second step, according to details of the image upsizing or image downsizing; and
a fourth step of determining the brightness of each pixel in an image of the object using the values of the parameters obtained after the density increasing or decreasing of the third step.

11. The image conversion method of claim 1, wherein:
the plurality of parameters include at least one of a parameter about optical characteristics of a photograph subject, a parameter about surface normal of the photograph subject, and a parameter about a light source.

12. The device of claim 5, wherein:
the plurality of parameters include at least one of a parameter about optical characteristics of a photograph subject, a parameter about surface normal of the photograph subject, and a parameter about a light source.

13. The program of claim 7, wherein:
the plurality of parameters include at least one of a parameter about optical characteristics of a photograph subject, a parameter about surface normal of the photograph subject, and a parameter about a light source.

14. The texture mapping method of claim 8, wherein:
the plurality of parameters include at least one of a parameter about optical characteristics of a photograph subject, a parameter about surface normal of the photograph subject, and a parameter about a light source.

15. The texture mapping device of claim 9, wherein:
the plurality of parameters include at least one of a parameter about optical characteristics of a photograph subject, a parameter about surface normal of the photograph subject, and a parameter about a light source.

16. The program of claim 10, wherein:
the plurality of parameters include at least one of a parameter about optical characteristics of a photograph subject, a parameter about surface normal of the photograph subject, and a parameter about a light source.

* * * * *

UNITED STATES PATENT AND TRADEMARK OFFICE
CERTIFICATE OF CORRECTION

PATENT NO. : 7,486,837 B2  Page 1 of 1
APPLICATION NO. : 11/369975
DATED : February 3, 2009
INVENTOR(S) : Hideto Motomura et al.

It is certified that error appears in the above-identified patent and that said Letters Patent is hereby corrected as shown below:

In claim 7, col. 23, line 39, "wherein the parameters are determined" should be -- wherein the plurality of parameters are determined --

In claim 10, col. 24, line 41, "of predetermined illumination" should be -- of a predetermined illumination --

Signed and Sealed this

Fifth Day of May, 2009

JOHN DOLL
*Acting Director of the United States Patent and Trademark Office*